United States Patent
Ross et al.

(10) Patent No.: US 9,983,585 B1
(45) Date of Patent: May 29, 2018

(54) METHOD AND APPARATUS FOR OPERATION OF A REMOTE SENSING PLATFORM

(71) Applicant: The United States of America, as represented by the Secretary of the Navy, Washington, DC (US)

(72) Inventors: Issac M. Ross, Monterey, CA (US); Ronald J. Proulx, Waban, MA (US); Joseph M. Greenslade, Camarillo, CA (US); Mark Karpenko, Salinas, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days. days.

(21) Appl. No.: 15/427,858

(22) Filed: Feb. 8, 2017

Related U.S. Application Data

(60) Provisional application No. 62/293,376, filed on Feb. 10, 2016.

(51) Int. Cl.
*G05D 1/00* (2006.01)
*H04N 7/18* (2006.01)
(Continued)

(52) U.S. Cl.
CPC ......... *G05D 1/0094* (2013.01); *B64G 1/1021* (2013.01); *B64G 1/286* (2013.01); *H04N 7/185* (2013.01); *B64G 2001/245* (2013.01)

(58) Field of Classification Search
CPC .... G05D 1/0094; B64G 1/1021; B64G 1/286; H04N 7/185
(Continued)

(56) References Cited

U.S. PATENT DOCUMENTS 5,960,097 A * 9/1999 Pfeiffer ............... G06K 9/3241
342/357.59
8,880,246 B1 11/2014 Karpenko et al.
(Continued)

OTHER PUBLICATIONS

Muscetta, N., HSTS: Integrating Planning and Scheduling, Carnegie Mellon University Technical Report, CMU-RI-TR-93-05, Pittsburgh, PA, Mar. 1993.
(Continued)

*Primary Examiner* — Thomas G Black
*Assistant Examiner* — Luat T Huynh
(74) *Attorney, Agent, or Firm* — Naval Postgraduate School; James B. Potts

(57) ABSTRACT

The disclosure provides a method and apparatus for determination of a control policy for a rigid body system, where the rigid body system comprises a sensor and a plurality of actuators designed to maneuver the rigid body system and orient the sensor toward a plurality of defined vertices, such as geographic points on the earth surface. A processor receives input data describing an initial state of the rigid body system and further receives a plurality of candidate vertices for potential targeting by the sensor. The processor additionally receives an intrinsic value for each vertex, reflecting the relative desirability of respective vertices in the plurality of vertices. The processor determines an appropriate control policy based on the vertices, the intrinsic values, and the rigid body system through a formulation of the determination process as an optimization problem which actively considers various constraints during the optimization, such as maneuvering and observation constraints.

19 Claims, 13 Drawing Sheets

(51) Int. Cl.
   *B64G 1/28* (2006.01)
   *B64G 1/10* (2006.01)
   *B64G 1/24* (2006.01)

(58) Field of Classification Search
   USPC .............................................. 701/13; 342/90
   See application file for complete search history.

(56) References Cited

U.S. PATENT DOCUMENTS

| | | | |
|---|---|---|---|
| 9,038,958 B1 | 5/2015 | Ross et al. | |
| 9,857,475 B2* | 1/2018 | Yunck | G01S 19/14 |
| 2008/0251646 A1* | 10/2008 | Heiberg | B64G 1/286 244/165 |
| 2011/0084871 A1* | 4/2011 | Haykin | G01S 7/282 342/82 |

OTHER PUBLICATIONS

Herz et al., "Collection Planning for the OrbView-3 High Resolution Imaging Satellite," SpaceOps 2006 Conference, Rome, Italy, Jun. 21-23, 2006. AIAA 2006-5798.

Martin, "Satellite Image Collection Optimization," Optical Engineering, 41(9) (2002).

Bedrossian et al, "Overclock My Satellite: Sophisticated Algorithms Boost Satellite Performance on the Cheap," IEEE Spectrum Magazine, 49 (11) (2012).

Karpenko et al., "Flight Implementation of Shortest-Time Maneuvers for Imaging Satellites," Journal of Guidance, Control, and Dynamics, 37(4) (2014).

Lemaitre et al, "Selecting and Scheduling of Observations of Agile Satellites," Aerospace Science and Technology, 6(5) (2002).

Vasquez et al., "A Logic-Constrained Knapsack Formulation and a Tabu Algorithm for the Daily Photograph Scheduling of an Earth Observation Satellite," available at http://link.springer.com/article/10.1023/A:1011203002719, last accessed Feb. 6, 2017.

Jang et al., "Image Collection Planning for KOrea Multi-Purpose SATellite-2," European Journal of Operational Research, 230(1) (2013).

Herz, "EO and SAR Constellation Imagery Collection Planning," SpaceOps 2014 Conference,Pasadena, CA, May 5-9, 2014. AIAA 2014-1728.

Ross et al., "A Review of Pseudospectral Optimal Control: From Theory to Flight," Annual Reviews in Control, 36(2) (2012).

Kaufman, "Automated Maneuver Design and Checkout for the Lunar Reconnaissance Orbiter," MS Thesis in Astronautical Engineering, Naval Postgraduate School, Monterey, CA, Dec. 2014.

Sedlak et al., "Lunar Reconnaissance Orbiter (LRO) Attitude Maneuver Planning," International Symposium on Spaceflight Dynamics, Toulouse, France, Sep. 28-Oct. 2,2009.

Kang et al., "Pseudospectral Optimal Control and its Convergence Theorems," Analysis and Design of Nonlinear Control Systems, Springer-Verlag, Berlin Heidelberg, 2008, pp. 109-126.

Karpemko et al., "Implementation of Shortest-Time Maneuvers for Generic CMG Steering Laws," Proceedings of the AIAA/AAS Astrodynamics Specialist Conference, Aug. 13-16, 2012, Minneapolis, MN. AIAA 2012-4959.

Gong et al., "A Pseudospectral Method for the Optimal Control of Constrained Feedback Linearizable Systems." IEEE Transactions on Automatic Control, 51(7) (2006).

Sekhavat et al., "Time-Optimal Nonlinear Feedback Control for the NPSAT1 Spacecraft," Proceedings of the 2005 IEEE/ASME International Conference on Advanced Intelligent Mechatronics, AIM 2005, Jul. 23-28, 2005 Monterey, CA.

Fleming et al., "Minimum-time Reorientation of a Rigid Body." Journal of Guidance, Control and Dynamics, 33(1) (2010).

\* cited by examiner

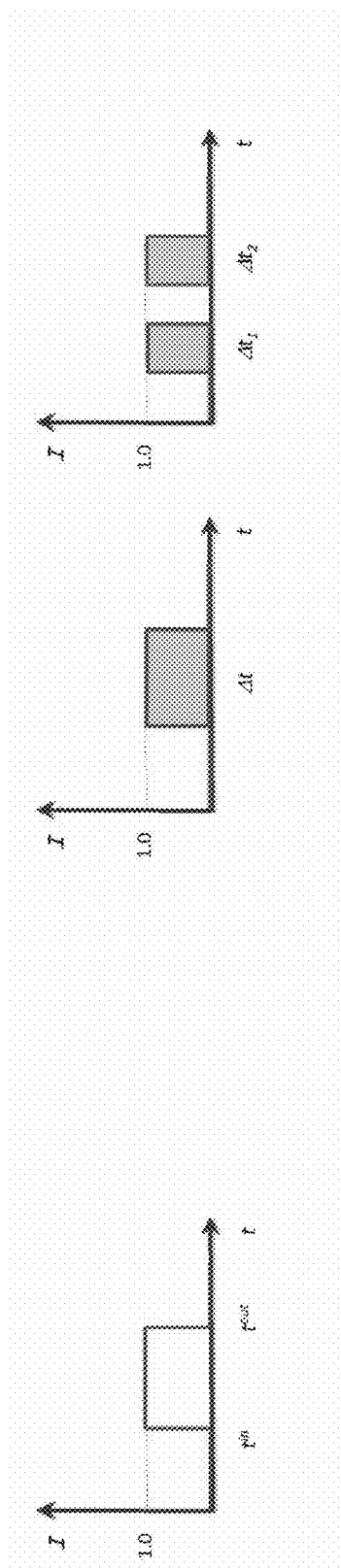

METHOD AND APPARATUS FOR OPERATION OF A REMOTE SENSING PLATFORM

RELATION TO OTHER APPLICATIONS

This patent application claims priority from provisional patent application 62/293,376 filed Feb. 10, 2016, which is hereby incorporated by reference in its entirety.

FIELD OF THE INVENTION

One or more embodiments relates to an apparatus and method for the determination of a control policy for scheduling, planning, and operating a rigid body system, where the rigid body system comprises a sensor and a plurality of actuators designed to maneuver the rigid body system.

BACKGROUND

In the operation of a many sensing systems intended to monitor objects of interest to an operator, it is generally desired to determine a collection plan and/or a collection schedule. The collection plan and/or schedule should satisfy various constraints such as physics constraints, occultation avoidance constraints, operational constraints, and collection value constraints, while also maximizing or minimizing a given payoff function, for example profit, number of images collected, quality of images collected, etc. Collection schedules are generally derived from a set of customer requests or provided to an operator from some other appropriate source. Further, when the sensor is mobile and dependent on supporting systems for orientation, for example an imaging package on a satellite, any potential collection schedules are strictly limited by the underlying abilities of the supporting systems themselves. This generates a series of constraints that every collection plan must observe enroute to maximizing payoff.

Typically this combined problem is solved by decomposing the problem into separate problems of planning and scheduling. Generally, a solution to the scheduling subproblem generates an "optimal" sequence (i.e., a walk) for a given payoff function (e.g., profit), and this scheduling sequence is then used to create a plan by testing the feasibility of the sequence against existing constraints by simulating the entire multi-point trajectory using a high fidelity simulator. If the test fails, the entire process or parts of the process are repeated (usually via an operator in the loop) until a feasible solution is obtained. This type of two-step analysis generally requires many iterations and is typically computationally expensive, particularly at the second step which typically involves Monte Carlo or other sampling type evaluations.

It would be advantageous to avoid this multi-step process by providing a method and apparatus which intergrates the entire problem as a dynamic optimization problem. This would avoid many of the simplifications and assumptions made in the current state-of-the-art in favor of a higher fidelity solution that enhances the payoff and enables solutions to be obtained more rapidly than by combinatorial techniques currently utilized in the art.

These and other objects, aspects, and advantages of the present disclosure will become better understood with reference to the accompanying description and claims.

SUMMARY

The disclosure provides a method and apparatus for determination of a control policy for a rigid body system, where the rigid body system comprises a sensor and a plurality of actuators designed to maneuver the rigid body system and orient the sensor toward a plurality of defined vertices, such as geographic points on the earth surface. A processor receives input data describing an initial state of the rigid body system and further receives a plurality of candidate vertices for potential targeting by the sensor. The processor additionally receives an intrinsic value for each vertex, reflecting the relative desirability of respective vertices in the plurality of vertices. The processor determines an appropriate control policy based on the vertices, the intrinsic values, and the rigid body system through a novel formulation of the determination process as an optimization problem. The novel formulation allows determination of a control policy u(t) through a process which actively considers various constraints during the optimization, such as maneuvering and observation constraints. This unified solution method provides a significant advantage over current art systems that typically generate a path based solely on the values of vertices and edges on a graph, then conduct a series of trial runs in a high fidelity simulator to determine if the various constraints in effect are met by the determined path.

The novel apparatus and principles of operation are further discussed in the following description.

BRIEF DESCRIPTION OF THE DRAWINGS

FIG. 13 illustrates an indicator function.

FIG. 14 illustrates a first function generating a $\Delta t_i^C$.

FIG. 15 illustrates a second function generating the $\Delta t_i^C$.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method and apparatus for guiding a sensor over a group of vertices during the transition of a rigid body system from an initial system state.

The apparatus and method operates to provide a control policy for a rigid body system comprising a sensor and a plurality of actuators designed to maneuver the rigid body system. A processor receives input data and a plurality of candidate vertices for potential targeting by the sensor, as well as an intrinsic value for each vertex which reflects the relative desirability of respective vertices in the plurality of vertices. The processor implements a novel methodology allowing the control policy determination to be formulated as a dynamic optimization problem, such that various constraints such as any maneuvering limitations are considered during determination of the control policy. The unified solution method provided allows significant advantage over typical methodologies, which typically initially generate candidate paths based solely on the value of vertices and edges on a graph, then conduct a series of trial runs in a high fidelity simulator to determine if the various constraints in effect are met by the determined path.

Figure 1:
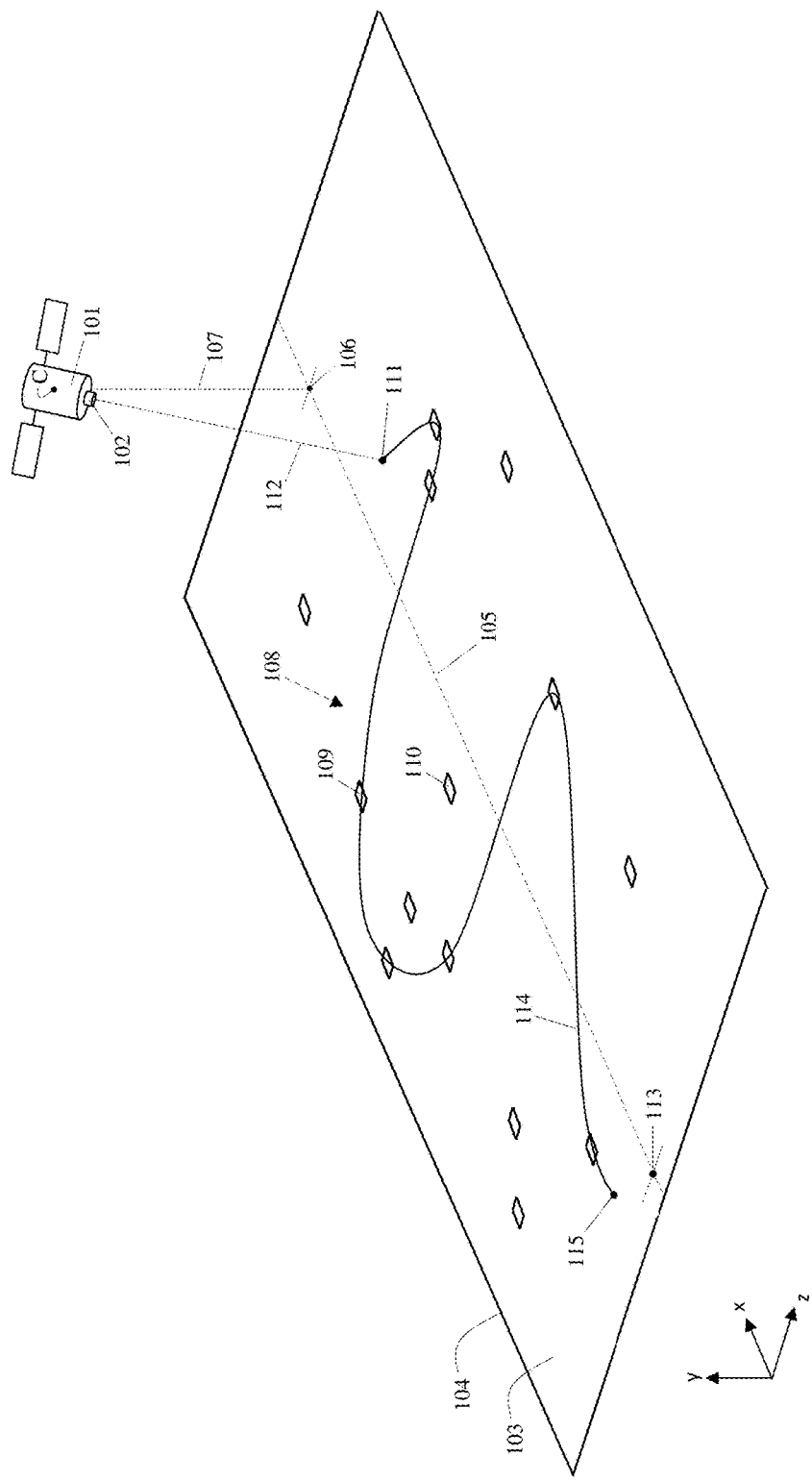
FIG. 1 illustrates the operation of a rigid body system comprising a sensor.

Illustrated at FIG. 1 is a rigid body system exemplified as a satellite 101 and comprising a remote sensor 102, such as an imaging package aboard the satellite. Satellite 101 as depicted traverses over a geographic area 103 surrounded by border 104, with position as a function of time over geographic area 103 indicated by route 105. FIG. 1 depicts satellite 101 at some time $t_f$ with satellite 101 referenced to ground position 106 through altitude reference 107 extending from geographic area 103 through point C, where C is some point within the rigid body system comprising satellite 101. Additionally depicted within geographic area 103 is a plurality of vertices generally indicated as 108, comprising vertices such as vertex 109 and vertex 110 among others. At FIG. 1, the vertices depicted are geographical locations with position referenced to geographic area 103 by some coordinate system, for example, latitude and longitude. For reference, axes x-y-z are provided with plane x-z parallel to geographic area 103 and axis y normal to plane x-z.

As referenced, satellite 101 comprises remote sensor 102 and directs the orientation of remote sensor 102 with respect to geographic area 103. At the time $t_f$ depicted at FIG. 1, satellite 101 is oriented with respect point C such that remote sensor 102 is oriented to a point 111 on geographic area 103, as indicated by alignment vector 112. Alignment vector 112 might be, for example, a direction indicated by the boresight of the imaging package carried on satellite 101. During a time period from an initial time $t_o$ to the time $t_f$ depicted, point C of satellite 101 traverses over geographic area 103 via route 105 from a ground position 113 at time $t_o$ to ground position 106 at time $t_f$. Additionally during the time interval $t_i \rightarrow t_f$, satellite 101 orients with respect to point C such that the orientation of remote sensor 102 with respect to geographic area 103 traces a path 114 from point 115 at time $t_o$ to point 111 at time $t_f$. As illustrated, during the transit from ground position 113 to ground position 106, satellite 101 orients such that the orientation of remote sensor 102 aligns with some portion of the plurality of vertices 108 during the transit, such as vertex 109, while missing others such as vertex 110.

Figure 2:
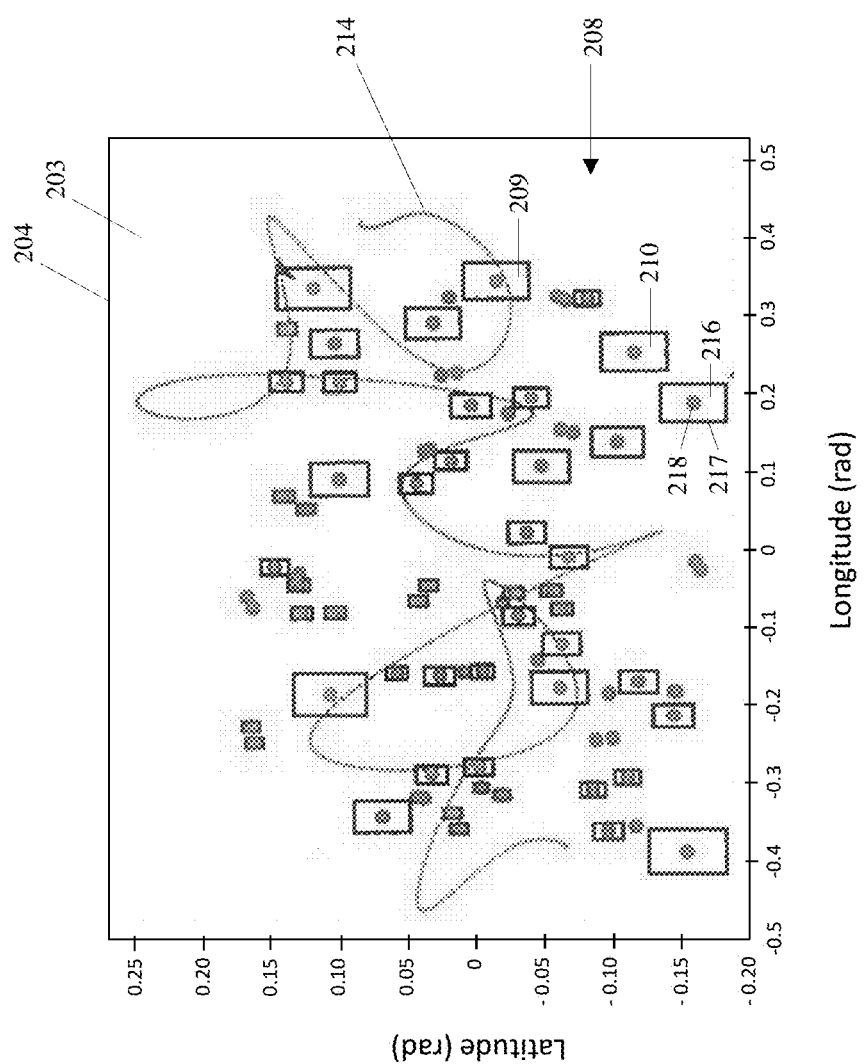
FIG. 2 illustrates a collection path for a plurality of defined vertices.

FIG. 1 depicts a typical scenario wherein a satellite or some other rigid body system comprising a remote sensor is utilized to observe targets positioned on geographic locations or areas. Various customer requests define a collection of possible targets such as the plurality of vertices 108, while various constraints on the satellite such as physics constraints, occultation avoidance constraints, operational constraints, collection value constraints, and others generally prevent acquisition of all existing requests present. In such a situation and as is understood, and using satellite 101 as an example, it becomes necessary to determine an imaging sequence connected by an attitude maneuvering sequence which satisfies the various constraints present, while maximizing a given payoff function. The payoff function may express various objectives, such as imaging a maximum number of vertices within the plurality of vertices 108, satisfying various dwell requirements over specific vertices, maximizing collections per unit time, maximizing a summation of intrinsically valued collects, and others. A more typical example of such a scenario is depicted at FIG. 2, illustrating a plurality of vertices 208 within a geographic area 203 bounded by 204 and indexed by latitude and longitude, and a path 214 generated by a remote sensor comprising a rigid body system during transit over geographic area 203. As indicated, of the approximately 77 vertices within the plurality of vertices 208, maximizing the appropriate payoff function given system constraints generates the path 214 allowing orientation of the sensor to coincide with about 19 vertices such as vertex 209, while failing to coincide with the remaining vertices such as vertex 210.

As is understood, execution of the imaging sequences represented by paths 114 and 214 by a rigid body system such as satellite 101 is accomplished by determining an appropriate control policy to act over some time interval from an initial time $t_o$ to a final time $t_f$. The control policy provides time-sequenced control parameters to typically a plurality of actuators comprising the rigid body system such that the rigid body system maneuvers over the time interval $t_i \rightarrow t_f$ in order to orient an on-board remote sensor in an appropriate manner given the desired vertices. For example, the control policy might provide direction to CMGs comprising satellite 101 in order to provoke the appropriate rotation of satellite 101 around point C over the time interval $t_i \rightarrow t_f$ such that remote sensor 102 orients to generate path 114 over the time interval $t_i \rightarrow t_f$. Typically the orientation of the remote sensor can be analytically described over time by a state space model $\dot{x}(t)$ with $\dot{x}(t)=f(x(t), u(t), t)$ for the rigid body system, where the $x(t)$ comprising the state space model $\dot{x}(t)$ represents one or more state variables parameterized by the time t and the u(t) comprising the state space model $\dot{x}(t)$ represents one or more control variables parameterized by the time t and representing the control policy to be affected by the on-board actuators. This provides a dynamical model of a state-determined rigid body system in the state space of the rigid body system which fully describes the rigid body system in its state space by providing the state variables x(t) and the response of x(t) to a given set of inputs described by u(t). As result, knowledge of the state variables $(x_1(t_0), x_2(t_0), \ldots, x_n(t_0))$ at some initial time $t_0$ and the inputs u(t) for $t \geq t_0$ is sufficient to determine all future behavior of the system within a state space of the rigid body system, where the state space is a vector space having dimensionality equal to the quantity of the state variables x(t). See e.g. M. Gopal, *Control Systems: Principles and Design* ($2^{nd}$, 2002), among others. Similarly, knowledge of a state vector x comprising the state variables at a particular time t is sufficient to specify the orientation of the remote sensor in the state space at the particular time t.

Additionally, and as understood, the state variables x(t) comprising the state space model $\dot{x}(t)$ and describing the system in the coordinates of the state space can be associated or approximated to coordinates expressed in alternately defined spaces through some function L(x). For example, with regard to satellite 101, a set of state variables $x(t_i)$ defined at a time $t_i$ and describing the orientation of remote sensor 102 within the state space of satellite 101 can be associated or approximated to the l-space system bordered by 104 within which the plurality of vertices 108 are defined, such that an orientation of remote sensor 102 with respect to the l-space may be determined at the time $t_i$. For example, at the time $t_f$ illustrated at FIG. 1, a set of state variables $x(t_f)$ comprising the satellite 101 state vector x at $t_f$ will describe the orientation of remote sensor 102 within the state space of satellite 101 and relative to for example point C. A function L(x) may be utilized in order to map the state variables $x(t_f)$ to the l-space of geographic area 103 and determine the alignment vector 112 indicating orientation of remote sensor 102 toward ground position 111. Alternately, given ground position 111, the function L(x) may be utilized to define or approximate the set of state variables $x(t_f)$ necessary within the state space of satellite 101 at the time $t_f$.

Disclosed herein is a method and apparatus for guiding a sensor such as remote sensor 102 over a group of vertices comprising the overall plurality of vertices, during a transition of a rigid body system comprising the sensor from an initial system state, where the rigid body system affects orientation of the sensor using a plurality of actuators comprising the rigid body system. As further discussed below, the method and apparatus provides a control policy for a rigid body system comprising a sensor and a plurality of actuators designed to maneuver the rigid body system. A processor receives input data describing an initial state of the rigid body system and generally describing at least an initial point in the l-space. The initial point in the l-space is generally a point in the l-space where a sensor such as remote sensor 102 is directed at an initial time $t_o$ commencing a time interval to be evaluated. The initial point in the l-space may be specified as an explicit location in the l-space, or may be based on one or more state variables for the rigid body system defined at the time $t_o$, where the one or more state variables at the time time $t_o$ describe an orientation of the remote sensor in a state space of the rigid body system and a function L(x) is utilized to map the orientation from the state space to the l-space, as described below. The processor further receives a plurality of candidate vertices for potential targeting by the sensor of the rigid body system. Along with the plurality of vertices, the processor additionally receives an intrinsic value for each vertex, reflecting the relative desirability of respective vertices in the plurality of vertices. The processor determines a preferable sequence of orientations for the remote sensor toward some portion of the vertices during the transition of the rigid body system through an optimization process, which incorporates mapping state vectors of the rigid body system to the l-space of the vertices (such as earth) and evaluating a payoff function based on the combined value of the vertices monitored during a given pass under evaluation. The novel formulation of the determination process as a dynamic optimization problem allows determination of a control policy u(t) which considers various constraints during the optimization, such as any maneuvering limitations inherent within the rigid body system, or a need to observe a certain vertex for a certain dwell time, or within a certain elevation range with respect to the l-space. This type of unified solution method provides a significant advantage over typical systems which initially generate a path based solely on the value of vertices and edges on a graph, then conduct a series of trial runs in a high fidelity simulator to determine if the various constraints in effect are met by the determined path. A satellite comprising an on-board imaging package and maneuvered via a series of CMGs is selectively used as an exemplary system, however any rigid body system employed and constrained as described may utilize the present disclosure. For example, the present disclosure could be applied to an underwater vehicle charged with orienting a sonar array at particular targets, a loitering drone charged with providing communication to and from various ground stations by pointing an antenna, a drone with a gimbaled imager tasked with photographing or otherwise imaging points of interest, and other similar applications.

As used herein, "state space" refers to a vector space having dimensionality at least equal to the quantity of the state variables x(t) comprising the state space model $\dot{x}(t)$ of the rigid body system. In an embodiment, the state space is defined by a plurality of axes where each axis in the plurality of axes corresponds to one of the state variables x(t) comprising the state space model $\dot{x}(t)$ of the rigid body system. In a further embodiment, each of the state variables x(t) comprising the state space model $\dot{x}(t)$ are linearly independent from any other state variable x(t) comprising the state space model $\dot{x}(t)$.

Additionally, a "state space model $\dot{x}(t)$" refers to a representation of the rigid body system comprising an x(t) and a u(t), with x(t) representing one or more state variables parameterized by a time t and u(t) comprising one or more control variables parameterized by the time t, where the x(t) is functionally related to the u(t), and the one or more state variables define a vector describing an orientation of the remote sensor of the rigid body system within the state space, and the one or more control variables represent the control policy to be affected by the on-board actuators. Similarly, a "state vector $x(t_M)$" where $t_M$ is a defined time such as $t_o$ or $t_f$ means a state vector x where at least the one or more state variables are quantitatively defined at the time $t_M$. Correspondingly, a state vector $x(t_o)$ effectively specifies the orientation of the remote sensor in the state space at the time $t_o$.

Additionally, "l-space" refers to a space having reference frame comprising two or more independent axes where the two or more independent axes describe a location of each vertex $l_i$ comprising the plurality of vertices within the l-space. In a particular embodiment, the l-space is a geographic area having independent axes such as latitude and longitude, or a similar location system.

Additionally, a "function L(x)" means a function which associates values of the state variables x(t) in the state space to a location in the l-space. For example, given the orbit and attitude vector of a spacecraft comprising a remote sensor with a boresight, the function L(x) may be utilized to determine the intersection point of the boresight in the l-space. The function L(x) need not be explicit.

Additionally, a "rigid body system" as used herein means a system comprising the remote sensor and the plurality of actuators and comprising a rigid body connected to at least the plurality of actuators, where the rigid body is idealized as a solid body in which deformation is neglected. See e.g., A Rao, *Dynamics of Particles and Rigid Bodies: A Systematic Approach* (2006), among others.

The method and apparatus disclosed operates on a plurality of vertices 1 where every vertex comprises a point defined by a coordinate in an l-space, and where the l-space is a real coordinate space. Here, a vertex comprising a point means either a vertex specified by a specific location of the l-space, or specified by some area in the l-space surrounding the point, or the domain of a bump function centered on the point, as will be discussed. For example at FIG. 2, vertex 216 within the l-space depicted and described by latitude and longitude might be described by area surrounded by boundary 217 which comprises point 218. The area may be expressed explicitly and surround the point, or may be expressed as a function of the point, as will be discussed. Additionally, each vertex l in the plurality is assigned a value indicator v which defines an intrinsic value for the vertex l and generally establishes relative collection worth among vertices over the entire plurality.

Figure 3:
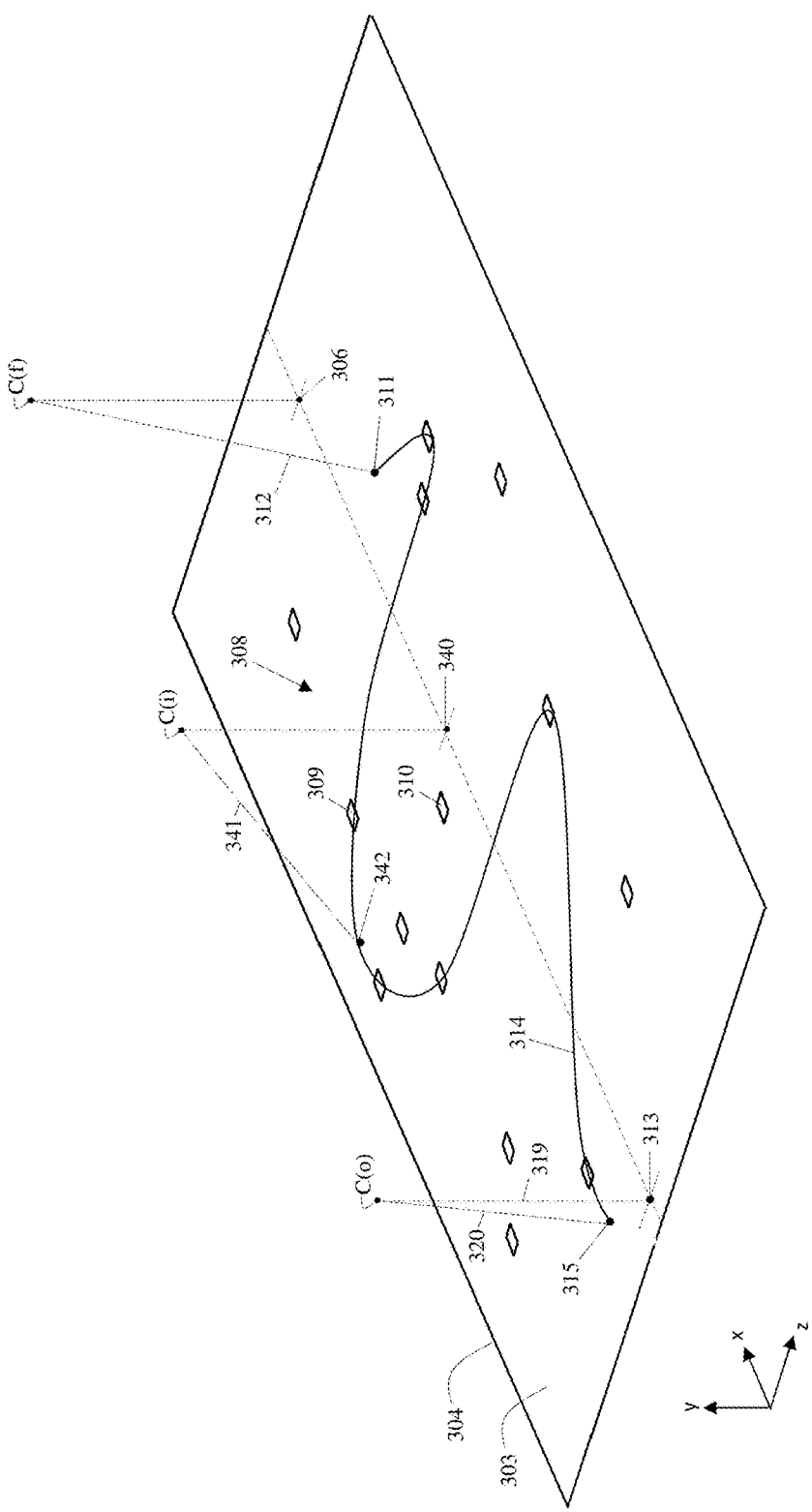
FIG. 3 illustrates the orientation of a rigid body system at points within a time interval.

The method and apparatus provides the plurality of vertices l and the value indicator v for each vertex l to a processor as input data, and the processor stores each vertex l and the assigned value v in the memory for repeated access during the process, as will be discussed. Additionally provided to the processor as input data is an initial system state of the rigid body system. The initial system state defines state variables $x(t_o)$ comprising a state vector x of the rigid body system at an initial time $t_o$, and describes the orientation of the sensor comprising the rigid body system at $t_o$. For example, FIG. 3 illustrates a plurality of vertices 308 including vertices 309 and 310 and specified within the l-space depicted as area 303 surrounded by border 304, with axes x-y-z provided such that plane x-z is parallel to area 303 and axis y normal to plane x-z. Additionally depicted is a curve C(o) of the rigid body system and illustrated relative to the l-space of area 303 by 319 extending through C(o) and a point 313 on the l-space of area 303. The state variables $x(t_o)$ defined by the input data indicate the orientation of a sensor comprising the rigid body system at $t_o$ within the state space of the rigid body system.

Additionally provided as input data is a final time $t_f$. The final time $t_f$ may be explicitly provided as a definitive time, or may be provided by a final position of the point C in, e.g., l-space, or may be provided by specifying any particular state of the rigid body when the particular state is chronologically dependent and can be utilized to determine a final time $t_f$. The processor receiving the input data is programmed to perform a series of steps through which an optimized curve s for steering the remote sensor over the plurality of supplied vertices is determined. The processor reads the input data and typically stores each vertex l in a first data structure comprising the memory and additionally stores the value indicator v for the each vertex l in a second data structure comprising the memory. In an embodiment, the second data structure is indexed to the first data structure. For example, for a plurality of n vertices, the first and second data structure might comprise a n×m array where a specific vertex and its associated value are stored as elements in a common row of the array.

The processor additionally retrieves the initial system state of the rigid body system and determines an initial point in the l-space. In order to determine the initial point, the processor utilizes at least the state variables $x(t_o)$ provided via the input data and evaluates a function L(x) at the time $t_o$ in order to map the state vector x at the initial time $t_o$ from the state space of the rigid body system to the l-space of the plurality of vertices 1. For example, at FIG. 3 and with C(o) referenced to point 313 on the l-space of area 303, the processor utilizes the initial system state of the rigid body system (not shown) and the function L(x) in order to determine an orientation 320 of a remote sensor toward the initial point in the l-space represented as ground position 315. Here, the processor may retrieve the initial system state of the rigid body system as explicit values for each of the state variables $x(t_o)$, or may receive the initial system state as predicted values based on an extrapolation from a state vector x(t−), where time t− precedes the initial time $t_o$ and the state vector x (t−) is dependent on the state of the actuators comprising the rigid body system at or before the time t−. The processor further establishes a time interval from the initial time $t_o$ to the final time $t_f$ indicated by the input data.

The processor utilizes the input data to determine an optimized curve s over the time interval through an optimization process based on a payoff functional $P_s$, where the payoff functional $P_s$ describes a combined value of a given curve s based on the value indicators v of the vertices covered by the given curve s. The processor initiates the optimization by defining an initial curve s, where the initial curve s is a curve through the l-space of the plurality of vertices provided, which intersects the initial point in the l-space, and which is parameterized by the time t. In a particular embodiment, the initial curve s is a polynomial approximation comprising a series of points in the l-space and an interpolation between the points, such as a Barycentric, Lagrange, Newton, or other interpolation known in the art. In a particular embodiment, the initial curve s in l-space is also defined as a function of at least the u(t), the x(t), or combinations thereof that comprise the state space model $\dot{x}(t)$ by using the function L(x), in order to actively consider any control constraints during the optimization toward a solution, as discussed below.

The processor determines a payoff for each specific vertex $l_i$ in the plurality of vertices by retrieving a specific vertex $l_i$ from the first data structure of the memory and utilizing an indicator function to compare the specific vertex $l_1$ to the path in l-space generated by the initial curve s. The indicator function returns a first constant, for example one, if the specific vertex $l_i$ coincides with the initial curve s at some time t over the interval from $t_o \rightarrow t_f$, and returns a second constant, for example zero, if the specific vertex $l_i$ does not coincide with the initial curve s at a time t over $t_o \rightarrow t_f$. Here, "coincides" means that some portion of the initial curve s and the specific vertex $l_i$ describe a common location in the l-space. Generally, the value of the indicator function for each specific vertex $l_i$ is stored in a third data structure in the memory indexed to the second data structure comprising the value indicators v received as input data, and typically a value of the indicator function will be determined for all vertices comprising the plurality of vertices. The processor proceeds to determine a payoff function $P_s$ for the initial curve s by multiplying the value indicator v for each specific vertex $l_i$ by the value of the indicator function returned for the each specific vertex $l_i$ and conducting a summation over all vertices in the plurality of vertices. The processor then seeks to optimize this payoff function $P_s$ by altering the initial curve s to generate a subsequent curve s and repeating the process for the subsequent curve s, until the processor determines a subsequent curve s generating a maxima for the payoff functional $P_s$. The processor treats the subsequent curve s generating the maxima as the optimized curve s. In a particular embodiment, the processor retrieves the value indicator v for the specific vertex $l_i$ from the second data structure.

Determination of an optimized path s using a payoff functional $P_s$ as described may be accomplished through optimization techniques known in the art. See e.g. Ross et al., "Pseudospectral Methods for Optimal Motion Planning of Differentially Flat Systems," *IEEE Transactions on Automatic Control* 49(8) (2004); see also Ross et al., "Issues in the real-time computation of optimal control," *Mathematical and Computer Modelling* 43 (2006); see also Ross et al., "A Unified Computational Framework for Real-Time Optimal Control," *Proceedings of the 42<sup>nd</sup> IEEE Conference on*

*Decision and Control* (2003); see also Ross et al., "A Review of Pseudospectral Optimal Control: From Theory to Flight," *Annual Reviews in Control* 36 (2012), among others.

With the optimized curve s determined through optimization, the processor maps the optimized curve s to the state space of the rigid body system and evaluates the state vectors x of the rigid body system necessary to direct the remote sensor over the optimum curve s over the time interval $t_o \rightarrow t_f$, in order to quantify a u(t) via the state space model $\dot{x}(t)$ and formulate a control policy for direction of the actuators comprising the rigid body system. In particular embodiments where the initial curve s in l-space is defined as a function of at least the u(t), the x(t), or combinations thereof by using the function L(x) and control constraints comprising portions of the u(t) and/or x(t) are specified during the optimization, the resulting motion adheres to the specified physical or other constraints, such as e.g. a maneuver rate limit. The processor thereby determines a control policy for the actuators over the time interval $t_o \rightarrow t_f$ such that the rigid body system orients to direct the remote sensor of the rigid body system to the optimized curve s during the time interval $t_o \rightarrow t_f$.

Figure 4:
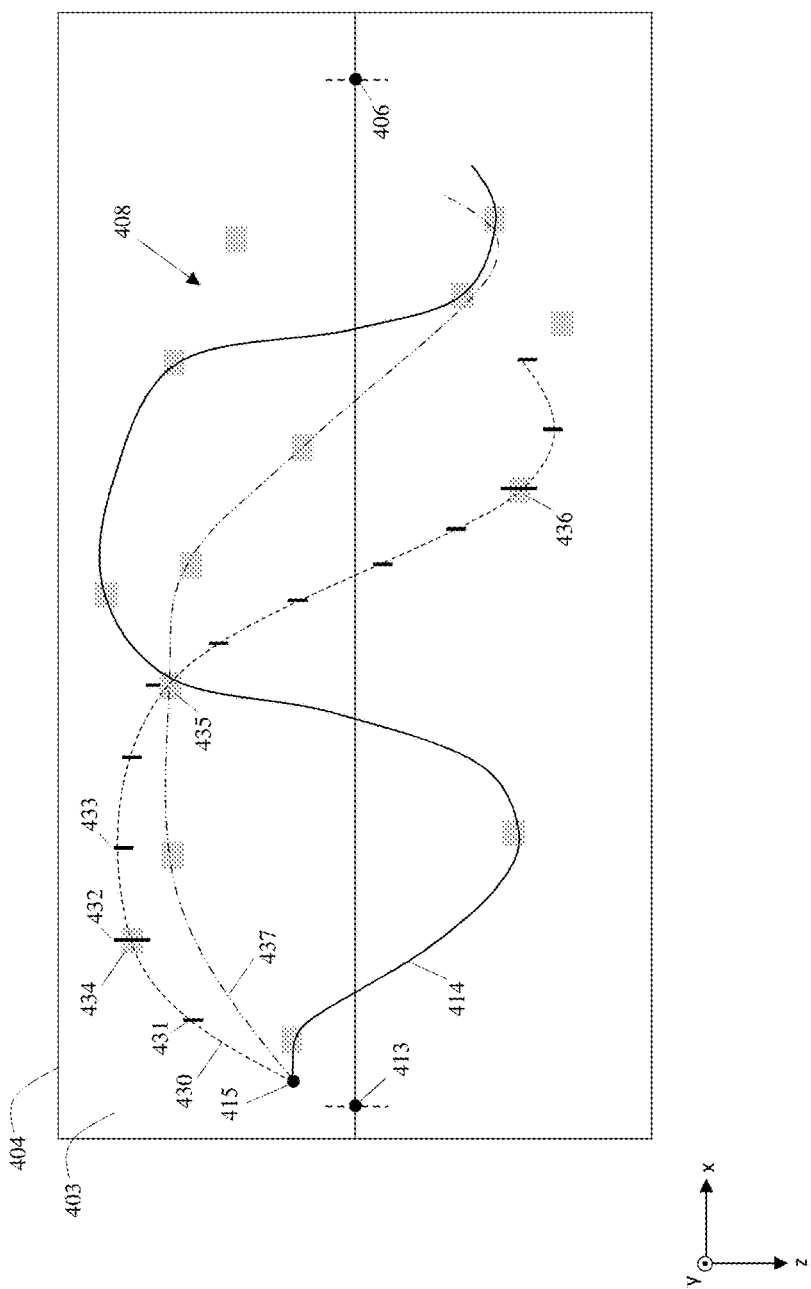
FIG. 4 illustrates an optimization to an optimum control policy.

A brief representation of the process conducted as the processor maximizes the payoff functional $P_s$ and optimizes to the optimized curve s is illustrated at FIG. 4. FIG. 4 illustrates area 403 enclosed within border 404 and generally indicates a plurality of vertices as 408. Area 403 is parallel to the x-z plane of the axes shown with the y axis proceeding out of the page. Additionally, FIG. 4 illustrates an initial curve s selected by the processor during optimization as path 430. Path 430 is parameterized by time t over the time interval $t_o \rightarrow t_f$. For reference, individual points residing on path 430 are delineated by the indicated markers such as 431, 432, and 433. In evaluating path 430, the processor evaluates the plurality of vertices 408 against path 430, and utilizes an indicator function to assign a first value such as one if a specific vertex $l_i$ coincides with path 430 over $t_o \rightarrow t_f$, and assign a second value such as zero if the specific vertex $l_i$ does not coincide with path 430 over $t_o \rightarrow t_f$. At FIG. 4 and as indicated by the markers on path 430 illustrated, vertices 434, 435, and 436 coincide with the initial curve s represented by path 430 over $t_o \rightarrow t_f$. The processor then determines the payoff functional $P_s$ for the initial curve s represented by path 430 using a summation of the value indicator v for each specific vertex $l_i$ multiplied by the value of the indicator function returned over all vertices in the plurality. For path 430, the payoff functional $P_s$ comprises $v_{434}I_{434} + v_{435}I_{435} + v_{436}I_{436}, +\Sigma v_{REM} I_{REM}$, where $v_{434}$, $v_{435}$, and $v_{436}$ are the assigned intrinsic values for vertices 434, 435, and 436, and $I_{434}$, $I_{435}$, and $I_{436}$ are the values of the indicator function for vertices 434, 435, and 436, and the subscript REM indicates all other vertices in the plurality. Using the values 1 and 0 for the indicator function as described results in the payoff functional $P_s$ reflecting the intrinsic values of vertices 434, 435, and 436 realized by path 430 while disregarding the remaining vertices missed by path 430. The processor alters the initial path s to a subsequent curve s such as path 437 and repeats the process to determine a payoff functional $P_s$ for path 437, and continues the process until a subsequent curve s generates a payoff functional $P_s$ providing a maxima, such as the path represented as 414.

In a particular embodiment, the processor segments the initial curve s into elements comprising a specific set, where each element in the specific set comprises one or more of the points in l-space which comprise the initial curve s. In a further embodiment, the processor stores the specific set in a fourth data structure comprising the memory and executes the indicator function by conducting a data structure intersection operation between the first data structure comprising the plurality of vertices and the fourth data structure, in order to generate the previously discussed third data structure comprising the value of the indicator function for each specific vertex $l_i$. In a further embodiment, the data structure intersection operates generates a Boolean array indexed to the first data structure, and associates the first constant and second constant of the indicator function with specific values comprising the Boolean array.

As discussed above, the processor maps the optimized curve s to the state space of the rigid body system and defines a control policy u(t) for execution over the time interval $t_o \rightarrow t_f$. For example, at FIG. 3 where an optimized curve s represented by path 314 originates at initial position 315 at time $t_o$ and concludes as a position 311 at time $t_f$, the processor utilizes the optimized curve s to determine a control policy u(t) for execution by the actuators comprising the rigid body system such that the remote sensor of the rigid body system orients to reproduce the optimized curve s on area 303 over the time interval the time interval $t_o \rightarrow t_f$, including orientation 320 at $t_0$ when the point C(o) has ground position 313, orientation 341 at some $t_i$ between $t_o$ and $t_f$ when the point C(i) has ground position 340, and orientation 312 at $t_f$ when the point C(f) has ground position 306.

A primary benefit of the approach disclosed is that when the curve s is expressed in terms of the u(t) and/or the x(t) of the state space model $\dot{x}(t)$ by using the function L(x), the optimization process conducted allows determination of a control policy u(t) which considers various constraints during the optimization, such as any maneuvering limitations inherent within the rigid body system, or a need to observe a certain vertex for a certain dwell time, or within a certain elevation range with respect to the l-space. This type of unified solution method provides a significant advantage over typical systems which initially generate a path based solely on the value of vertices and edges of a graph, then conduct a series of trial runs in a high fidelity simulator to determine if the various constraints in effect are met by the determined path. This type of two-step analysis generally requires many iterations that repeatedly require significant operations at a second step typically involving computationally expensive Monte Carlo type evaluations.

Correspondingly, in a particular embodiment, the curves s in l-space are defined as a function of at least the u(t) comprising the state space model $\dot{x}(t)$ by using the function L(x), and optimizing the payoff functional $P_s$ is subject to one or more control constraints restricting the control variables comprising the u(t) of the state space model $\dot{x}(t)$. For example, a control constraint might describe a jerk-limit for the rigid body system. Similarly in another embodiment, the curves s in l-space are defined as a function of at least the x(t) comprising the state space model $\dot{x}(t)$ by using the function L(x), and optimizing the payoff functional $P_s$ is subject to one or more path constraints restricting the state variables comprising the x(t) of the state space model $\dot{x}(t)$. For example, a path constraint might describe a keep-out zone for the remote sensor comprising the rigid body system.

An additional benefit of the process disclosed is the significant mitigation of required computational resources realized by use of the indicator function as disclosed. As discussed, in certain embodiments, the plurality of vertices received via the input data is stored within a first data structure and the value indicator v for each specific vertex $l_i$ is stored in a second data structure indexed to the first data structure. The processor utilizes the indicator function to denote coincidence of a given vertex with a parametrized curve s. In a particular embodiment the processor evaluates the indicator function through data structure intersection operations between established data structures in the memory. This methodology allows determining membership of a given vertex in a parameterized curve s under consideration with only a single evaluation of the parameterized curve s necessary and a single data structure intersection operation. In contrast, in the absence of an indicator function and an intersection operation between data structures, determining a curve that maximizes a payoff function $P_s$ must be done by a combinatorial process that generally requires an evaluation of the parameterized curve s for each possible sequence of vertices (i.e. the solution of a graph problem), resulting in significantly more consumption of computational resources and time. It is noted that solving a general graph problem is known by those skilled to be an NP-hard problem, meaning that such problems may not generally be solved in polynomial time.

It is understood that although FIG. 4 represents the specific set corresponding to path 430 as specific and individual points on path 430 for the purpose of illustration, other definitions dependent on curve s may be used, such as an area surrounding certain points of curve s, or respective ranges between individual points on curve s, or other definitions. Additionally, it is not necessary that the plurality of vertices be static within the l-space. The location of one or more vertices $l_i$ within the l-space may be defined as a function of other parameters present within the expression describing the curve s, such as a time t or other parameters. Additionally, the quantity of members within the specific set of a given curve s is not limited and may contain as many members as desired. Further, it is understood that although the initial, subsequent, and optimum curve s is discussed in terms of explicit position description with the l-space of area 403, explicit description using any alternate parameter may be utilized as convenient provided the parameter corresponds to a specific position of the curve s in the l-space.

Figure 5:
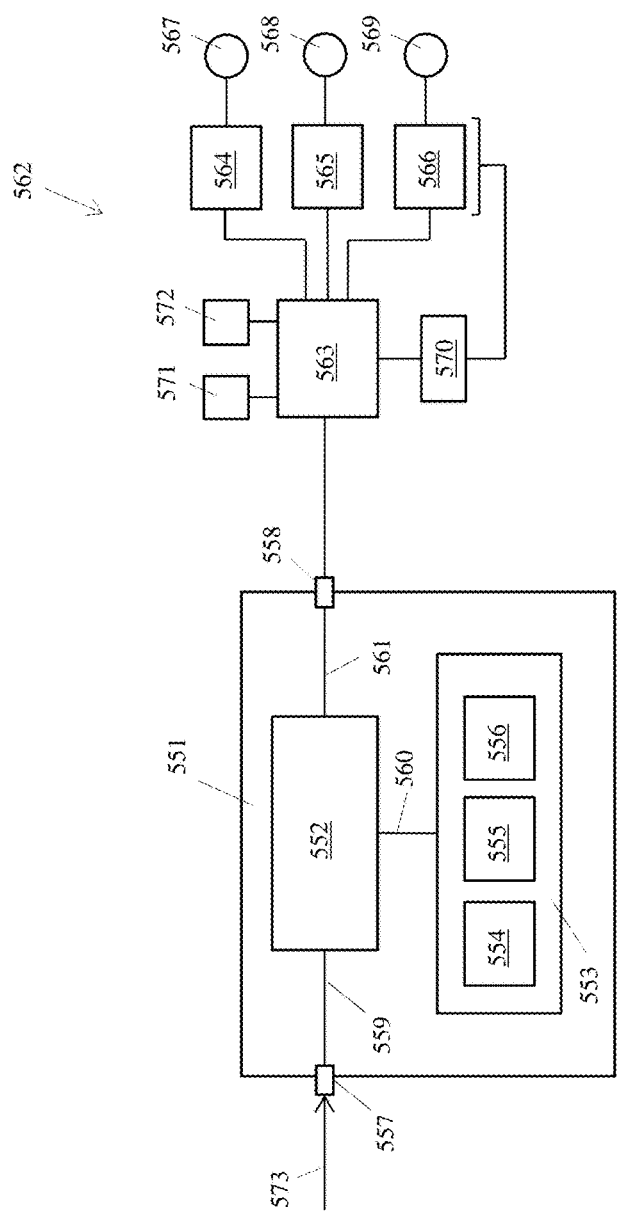
FIG. 5 illustrates an apparatus for determining a control policy for a rigid body system.

FIG. 5 illustrates an apparatus for conduct of the method disclosed. A processor 551 comprises an input communications port 557, a central processing unit (CPU) 552, a memory 553, and an output communications port 558, with CPU 552 in data communication with input communications port 557 via 559, in data communication with memory 553 via 560, and in data communication with output communication port 558 via 561. Output communications port 558 is in data communication with a guidance control module 563 comprising a rigid body system generally indicated at 562. Guidance control module 563 is in data communication with a plurality of actuators 564, 565, and 566, which communicate with actuators 567, 568, and 569 respectively. In certain embodiments, rigid body system additionally comprises feedback controller 570 in data communication with guidance control module 563 and actuators 567, 568, and 569. In other embodiments, rigid body system further comprises navigation system 571 and clock 572.

Figure 6:
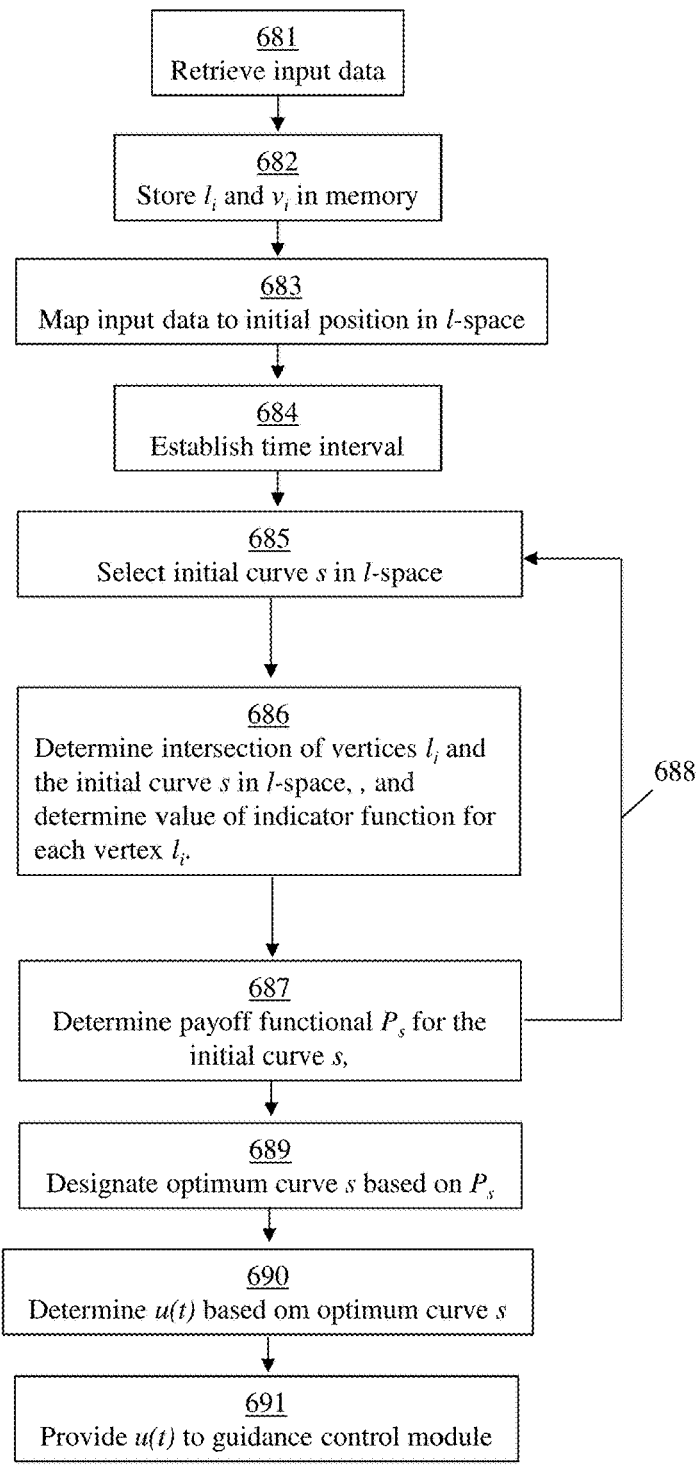
FIG. 6 illustrates a processor-implemented process for determining a control policy.

CPU 552 is programmed to perform steps providing a process generally indicated at FIG. 6. At step 681, CPU 552 retrieves input data through communications input port 557. At step 682, CPU 557 stores a plurality of vertices 1, and value indicator v assigned to each vertex $l_i$, in memory 553. At step 683, CPU 552 utilizes input data retrieved through communications input port 557 and maps the input data to an initial position in an l-space using a function L(x). At step 684, CPU 552 determines a time interval extending from an initial time $t_o$ to a final time $t_f$, where the initial time $t_o$ and final time $t_f$ are determined from the input data retrieved.

At step 685, CPU 552 begins the process of optimizing to an optimized curve s by selecting an initial curve s, where the initial curve s is a curve in l-space which includes the initial position determined previously. At step 686, CPU 552 retrieves the plurality of vertices $l_i$ from memory 553 and determines the intersection between the plurality of vertices $l_i$ and the current initial curve s, and determines a value of an indicator function for each specific vertex $l_i$, where the indicator function is equal to a first constant such as one if the specific vertex $l_i$, is a member of the specific set for the current initial curve s, and equal to a second constant such as zero if the specific vertex $l_i$ is not a member of the specific set for the current initial curve s. At step 687, CPU 552 determines a payoff function $P_s$ for the current initial curve s by retrieving the value indicators $v_i$ assigned to each vertex $l_i$ from memory 553 and conducting a summation, where the summation comprises the value indicator $v_i$ assigned to the each vertex $l_i$ multiplied by the value of indicator function for the each vertex $l_i$.

CPU 552 alters the initial curve s typically utilizing an optimization routine to obtain a subsequent curve s, and repeats steps 685, 686, and 687 at 688 using the subsequent curve s as the initial curve s. In a particular embodiment, the optimization routine incorporates one or more constraints based on the maneuvering limitations of rigid body system 562. CPU 552 conducts steps 685 through 687 until the payoff function $P_s$ is a maxima, and at step 689 designates the initial curve s producing the maxima as the optimized curve s.

At step 690, CPU 552 designates a u(t) for the rigid body system based on the optimized curve s, and at step 691, CPU 552 provides a control policy comprising the u(t) through communication output port 558 and to guidance control module 563. It is understood that in embodiments where the initial curve s is expressed as a function of the u(t) and/or x(t) comprising the state space model ẋ(t), and various control constraints are considered during the optimization, that the u(t) designated at step 690 may be a solution already explicitly determined during steps 685-688.

Guidance control policy module 563 is typically a digital processor and communicates with actuators 567, 568, and 569 to provide signals driving the actuators to operate control devices 567, 568, and 569 respectively in a manner described by the control policy u(t), in order to guide or position rigid body system in the l-space in a manner closely approximating or achieving the optimized curve s. In a particular embodiment, actuators 567, 568, and 569 provide feedback to feedback controller 570 in data communication with guidance control module 563. In a further embodiment, a navigation system 571 such as an Inertial Measurement Unit (IMU) or Global Positioning System (GPS) communicates navigation information describing the position and/or orientation of rigid body system 562 in the l-space and/or the state space x(t) at various times $t_i$, and in a further embodiment clock 572 provides indications of the various times $t_i$. Here, the control devices such as 567, 568, and 569 refer to physical devices comprising rigid body system 562 and whose operation impacts the position or orientation of rigid body system 562 within the l-space and/or the state space x(t). For example, the control devices might be CMGs, some type of surface such as a control fin, or some other device intended to impact rigid body system 562 within the l-space and/or the state space x(t).

An exemplary application of the method and apparatus disclosed follows.

Exemplary Space Collection Planning and Scheduling Problem

Let $R_1, R_2, \ldots R_{N_R}$ be the position vectors of a given set of point targets in an Earth centered Earth-fixed (ECEF) coordinate system with $\|R_i\| = R_\oplus$ for all $i=1, \ldots, N_R$, where $R_\oplus$ is the radius of the Earth.

Let (lat; long) be the polar coordinates of a point on Earth such that $(lat_i; long_i)$; $i=1, \ldots, N_R$ are the latitudes and longitudes of the point targets. In this example, simply pointing the boresight to a target for image collection has no value and a minimum elevation angle $elev_i^{min} > 0$ is required for imaging a given point i. Similarly, the elevation angle is required to be below some maximum value $elev_i^{max}$ (e.g., nadir imaging may be undesirable for some customers). Thus, the attributes (l-space) for image collection are $$l := \begin{bmatrix} lat \\ long \\ elev \end{bmatrix} \in \mathbb{R}^3 \tag{38}$$

and, a set $\mathbb{L}_i$ is given by, $$\mathbb{L}_i := \{(lat, long, elec) \in \mathbb{R}^3;$$

$$lat = lat_i, long = long_i, elev_i^{min} \leq elev \leq elev_i^{max}\} \tag{39}$$

It is worth noting that because imaging is done in open loop (i.e., there is no feedback from the target point to the spacecraft system), it is more practical to write $lat_i - \delta \leq lat \leq lat_i + \delta$ and similarly for long where, $\delta > 0$ defines the region for a "point." In other words, a bump function is more practical than an indicator function.

Figure 7:
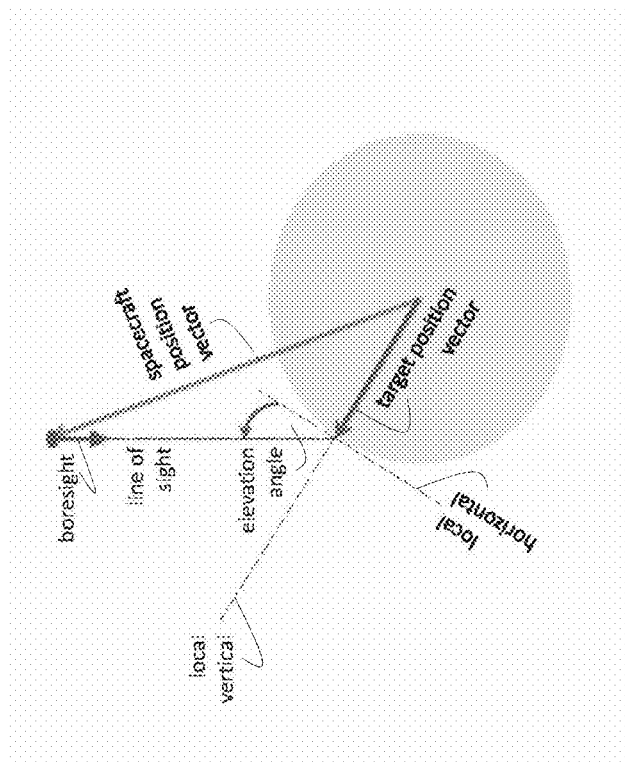
FIG. 7 illustrates parameters for a satellite comprising a sensor.

To produce feasible l-space trajectories, it is necessary to find a (possibly implicit) function $L: x \mapsto l$ where x is the state vector of the spacecraft. To this end, let r be the instantaneous position vector the spacecraft in ECEF and $q := (q_1, q_2, q_3, q_4)$ be the instantaneous "quaternion" that parameterize the direction cosine matrix $^E C^B(q)$ of a spacecraft body axis B relative to the ECEF system E. Then, the pair (r; q) defines the spacecraft's instantaneous position and attitude in ECEF. Let b be the unit vector in B that defines the boresight of the imaging system, and R the instantaneous position vector in ECEF of the intersection point between the boresight and Earth. Then, from elementary geometric considerations (FIG. 7, illustrating target position vector, spacecraft position vector, boresight, line of sight, elevation angle, local horizontal, and local vertical), R is determined by solving the equation $$\frac{r-R}{\|r-R\|_2} + {}^E C^B(q)\hat{b} = 0, \|R\|_2 = R_\oplus \tag{40}$$

Because R is a function of (lat,long), the above generates an implicit function $$L_A:(r,q) \mapsto (lat, long) \in \mathbb{R}^2$$

To find a function for the elevation angle in terms of (r; q), perform the following two steps. The cosine of the elevation angle may be computed by taking the orthogonal projection proj of the line-of-sight unit vector $(r-R)/\|r-R\|_2$ with the local horizontal plane LH. That is, write $$\cos(elev) = proj_{LH}\left(\frac{r-R}{\|r-R\|_2}\right) \tag{41}$$

Similarly, the sine of the elevation angle may be computed by $$\sin(elev) = proj_{LV}\left(\frac{r-R}{\|r-R\|_2}\right) \tag{42}$$

where, $proj_{LV}$ is the orthogonal projection of the unit vector with the local vertical LV. Thus, (41) and (42) may be used to find the elevation angle in the correct quadrant. Consequently, (41)-(42) generate an implicit function, $$L_B:(r,q) \mapsto elev$$

Thus the implicit function L is defined by $$L(r,q) := \begin{bmatrix} L_A(r,q) \\ L_B(r,q) \end{bmatrix}$$

that produces (lat; long; elev) for any given value of (r; q). By substituting (lat; long; elev) in (39), we can determine if it belongs to set $\mathbb{L}_i$ and hence compute the indicator function and/or the bump function.

To complete the problem formulation, assume r(t) is known for any and all t. This implies that the orbit is not actively controlled. The only control variable is in steering the bore sight, and hence the attitude of the spacecraft.

For attitude control, now use the full attitude dynamics of the spacecraft in the problem formulation. Because the attitude of the spacecraft can be controlled by a wide variety of actuators, the full dynamical equations are different for the different choice of actuators.

Over the last decade, it has been shown that the use of high-fidelity dynamical equations can substantially increase slew performance; hence, it is advantageous to use such equations for achieving high performance for a specific spacecraft. For the purposes of this example, we develop an actuator-independent dynamical model that harnesses some of the high-performance slews that have been ground-tested and demonstrated in flight onboard NASA spacecraft. This model is based on the concept of an agilitoid and is agnostic to the choice of the actuators. It is developed as follows: Let N denote the Earth-Centered Inertial (ECI) frame so that $$^N\dot{\omega}^B = u \in \mathbb{R}^3$$

is the inertial angular acceleration used as a generic control variable. Let $$^N\omega^B := (\omega_1, \omega_2, \omega_3)$$

be the body components of the angular velocity of the of the spacecraft B relative to ECEF. Then, the connection between $u := (u_1, u_2, u_3)$ and q is given by the dynamical equations, $$\dot{q}_1 = \frac{1}{2}(\omega_1 q_1 - \omega_2 q_3 + \omega_3 q_2)$$

$$\dot{q}_2 = \frac{1}{2}(\omega_1 q_3 + \omega_2 q_4 - \omega_3 q_1)$$

$$\dot{q}_3 = \frac{1}{2}(-\omega_1 q_2 + \omega_2 q_1 + \omega_3 q_4)$$

$$\dot{q}_4 = \frac{1}{2}(-\omega_1 q_1 - \omega_2 q_2 - \omega_3 q_3)$$

$$\dot{\omega}_1 = \omega_2 \Omega_3(q) - \omega_3 \Omega_2(q) + u_1$$

-continued $$\dot{\omega}_2 = \omega_3 \Omega_1(q) - \omega_1 \Omega_3(q) + u_2$$

$$\dot{\omega}_3 = \omega_1 \Omega_2(q) - \omega_2 \Omega_1(q) + u_3$$

where $\Omega_1$ (q), $\Omega_2$ (q), $\Omega_3$ (q) are functions of q that map the inertial angular velocity of earth $\Omega$ (assumed constant in N and along the #3 axis) to body coordinates, $$\begin{bmatrix} \Omega_1(q) \\ \Omega_2(q) \\ \Omega_3(q) \end{bmatrix} := [^B C^E(q)] \begin{bmatrix} 0 \\ 0 \\ \Omega \end{bmatrix}$$

Now constrain u according to, $$u = I^{-1}\tau, \tau \in T \quad (43)$$

where, $\tau$ is the torque vector and T is an appropriately margined torque space. Thus, even in the simplest case of a box constraint on the torque, the off-axis agility may be exploited by using (43) in the optimization process. Note that the use of dynamics in the formulation and generation of a collection plan in this disclosure is sharply different from all prior approaches where attitude slews are generated by using simple closed-form equations. As noted previously, such simplifications result in substantially reduced slew performance and hence inherently less payoff because of the use of more non-imaging time.

Collecting all of the preceding concepts and equations, formulate an illustrative satellite collection planning and scheduling problem as follows: Define the state x of the spacecraft as $$x := \begin{bmatrix} r \\ q \\ {}^E\omega^B \end{bmatrix} \in \mathbb{R}^{10} \quad (44)$$

Because the orbit is not controlled, r(t) is known for all t while $t \mapsto (q, {}^E\omega^B)$ is determined by a choice of the acceleration trajectory $t \mapsto u \in U$ where, U is determined through the use of an agilitoid. Through this process, determine the l-space time-trajectory through the use of the function l=L(x) given by, $$l := \begin{bmatrix} lat \\ long \\ elev \end{bmatrix} = \begin{bmatrix} L_A(r, q) \\ L_B(r, q) \end{bmatrix} := L(x) \quad (45)$$

Using (45), collect-time functionals (further discussed below) are computed according to $$T_i^C[x(\cdot)] := \int_{t_o}^{t_f} I(L(x(t), \mathbb{L}_i) dt \; i=1, \ldots, N_R$$

For the purposes of this example, use (20) (further discussed below) to generate a payoff functional, $$P[x(\cdot), u(\cdot), t_f] := \frac{1}{t_f - t_0} \sum_{i=1}^{N_R} v_i(1 - I(\Delta t_i^C, 0)) \quad (46)$$

where $\Delta t_i^C := T_i^C(x(\cdot))$. Replacing the indicator functions by smooth bump functions, the resulting optimal control problem can be solved using a standard pseudospectral (PS) method. In the following, DIDO, a MATLAB software package, was used to solve the smooth problem.

Results

Figure 8:
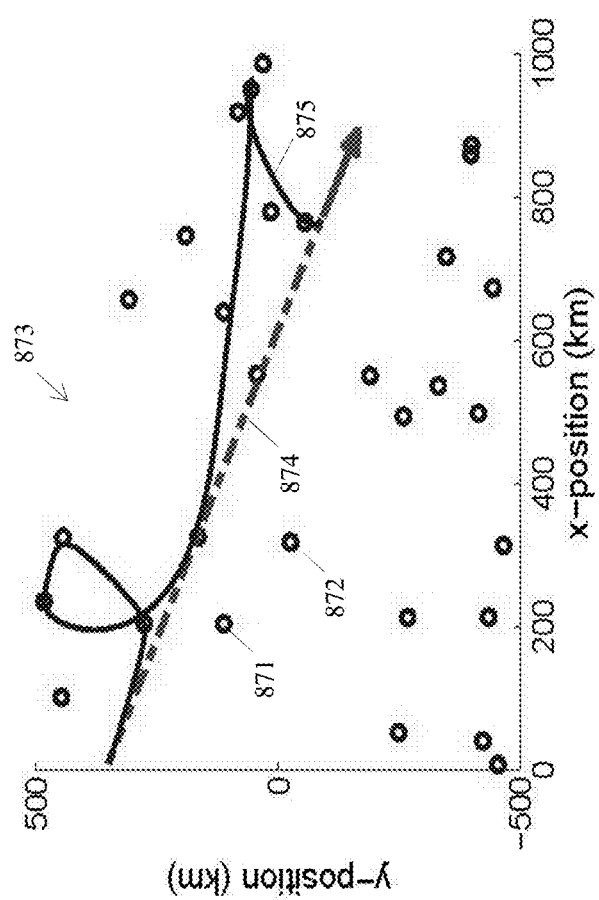
FIG. 8 illustrates a first exemplary collection path for a plurality of vertices.

FIG. 8 illustrates a set of 30 point targets such as 871 and 872 randomly distributed over a 500 km×1000 km field of regard 873. A candidate optimal solution to one such distribution is illustrated with the trace of the sub-satellite point illustrated as 874 and the trace of the boresight illustrated as 875. FIG. 8 represents a "one-shot" viable solution which considers the constraints present during the process of solving the collection planning and scheduling problem, rather than requiring the need for subsequent simulation in a high fidelity simulator to determine if the various constraints in effect are met. Note also that the result is not "intuitive" as apparent by the loops in the trace of the boresight.

Figure 9:
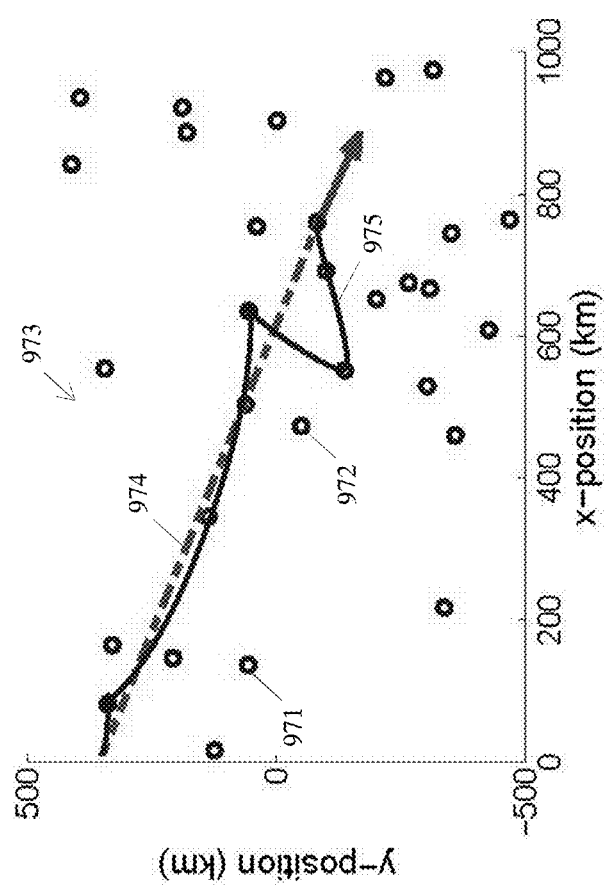
FIG. 9 illustrates a second exemplary collection path for a plurality of vertices.

FIG. 9 illustrates a second set of randomly distributed point targets such as 971 and 972 randomly distributed over field of regard 973, with trace of the sub-satellite point illustrated as 974 and the trace of the boresight illustrated as 975. It is apparent by visual inspection that both the distribution of the point targets and the candidate optimal solution shown in FIG. 9 are significantly different from those of FIG. 8. Note also that in FIG. 9, the boresight rolls across the ground track whereas in FIG. 8 the collection was performed exclusively on the "port side."

Figure 10:
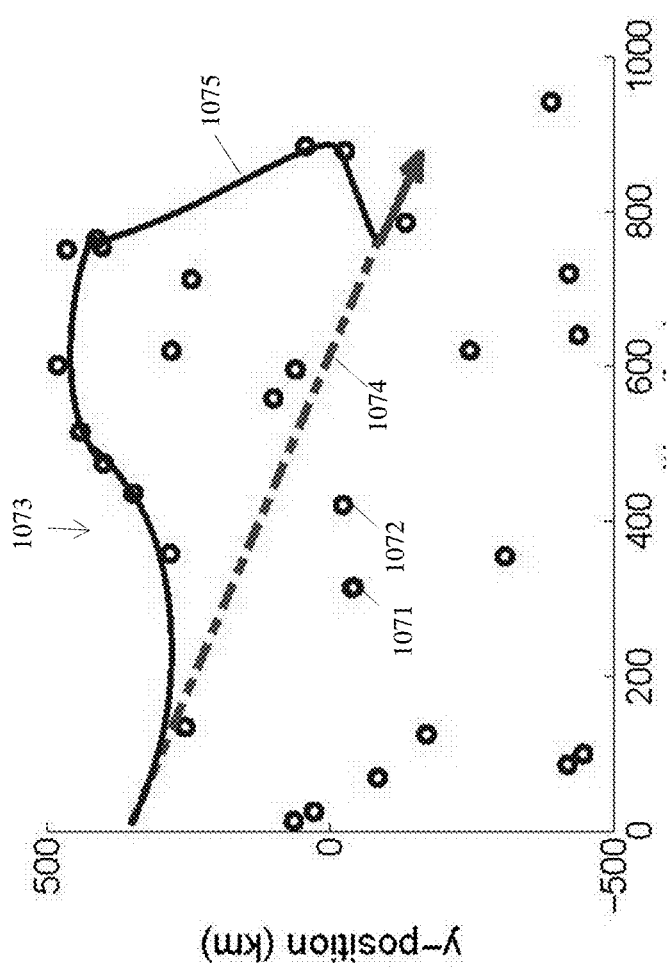
FIG. 10 illustrates a third exemplary collection path for a plurality of vertices.

A third set of results are shown in FIG. 10 for a third set of randomly distributed point targets such as 1071 and 1072 randomly distributed over field of regard 1073, with trace of the sub-satellite point illustrated as 1074 and the trace of the boresight illustrated as 1075. In this case, the distribution of targets happen to be more sparsely distributed away from the trace of the sub-satellite point. In this case, the spacecraft has to slew significantly in roll (compared to the results shown in FIGS. 8 and 9) to maximize the number of collects.

Additional Discussion and Theoretical Foundations:

This disclosure develops a completely new approach for solving the planning and scheduling problem. This approach eliminates much of the heuristics, simplification steps, and iterative loops by considering the entire problem as a single integrated dynamic optimization problem. The weights for the edges of the graph used in the current art are given implicitly by dynamical equations while the vertices are modeled through the use of an indicator function. The price for this integration is nonsmoothness in the problem formulation. Because the locations of the nonsmoothness is well-defined (i.e., the vertices of the graph), we can approximate the resulting problem to a smooth problem. The smooth problem can now be solved by well-established standard techniques leading to a high-quality solution that has the advantage of static and dynamic constraint satisfaction as its very first solution generation.

Mathematical Preliminaries

Let l be a variable in $\mathbb{R}^{N_i}$, $N_i \in \mathbb{N}$, and $\mathbb{L}_a \subset \mathbb{R}^{N_i}$ be an arbitrary compact subset of some $N_i$-dimensional real space. Define the Kronecker indicator function I of $\mathbb{L}_a$ as $$I(l; \mathbb{L}_a) := \begin{cases} 1 & \text{if } l \in \mathbb{L}_a \\ 0 & \text{if } l \notin \mathbb{L}_a \end{cases} \quad (1)$$

The Kronecker indicator function is also the Dirac measure $\mu^D$ (l; $\mathbb{L}_a$) on $\mathbb{R}^{N_i}$; hence, we define the multi-dimensional integration of I over $\mathbb{R}^{N_i}$ as $$\int \mathbb{R}^{N_i} I(l; \mathbb{L}_a) dl := \int \mathbb{R}^{N_i} d\mu^D(l; \mathbb{L}_a) = 1 \quad (2)$$

The Dirac delta function $\delta^D$ over $\mathbb{L}_a$ is (loosely) defined as $$\delta^D(l;\mathbb{L}_a) := \begin{cases} \infty & \text{if } l \in \mathbb{L}_a \\ 0 & \text{if } l \notin \mathbb{L}_a \end{cases} \text{ and } \int_{\mathbb{R}^{N_l}} \delta^D(l;\mathbb{L}_a) dl = 1 \quad (3)$$

Hence, it follows that we can also take I to be in its Dirac form for evaluating integrals with "dl" interpreted to be consistent with (2) and (3).

Now suppose we have a singleton $\mathbb{L}_a = \{l_a\}$ where, $l_a \in \mathbb{R}^{N_l}$ is a given point. Let, $C^*[l_a]$ be any curve in $\mathbb{R}^{N_l}$ parameterized by $s \in \mathbb{R}$ that passes just once through the point $l_a$. By using the symbol ds in the same sense as dl used in (2) and (3), we can evaluate the line integral of $I(\bullet; l_a)$: $\mathbb{R}^{N_l} \to \mathbb{R}$ with respect to $C^*[l_a]$ and write $$\int_{C^*[l_a]} I(\bullet; l_a) ds = 1 \quad (4)$$

Let C be any curve in $\mathbb{R}^{N_l}$ and $C[l_a]$ be the set of all curves in $\mathbb{R}^{N_l}$ that pass through the point $l_a$. Then, (4) implies we can use ds as a counting measure to define $$\int_C I(\cdot; l_a) ds := \begin{cases} N^C & \text{if } C \in C|l_a| \\ 0 & \text{if } C \notin C|l_a| \end{cases} \quad (5)$$

where, $N^C$ is the number of times the curve C passes through the point $l_a$.

Development of a Real-Valued Label Space

For purposes of an initial development, we assume the vertices of a collection planning graph to be all point targets. Subsequently, we will generalize the case to an arbitrary collection of disparate targets.

Figure 12:
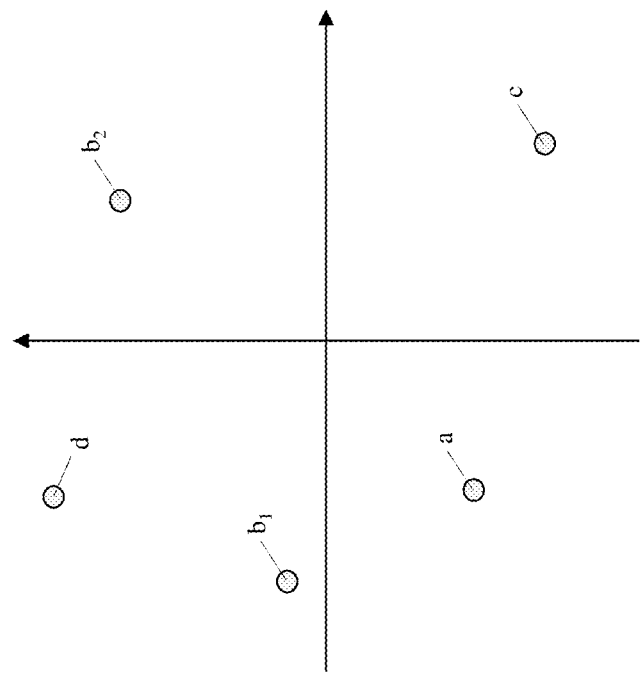
FIG. 12 illustrates the collection planning graph in real space.
Figure 11:
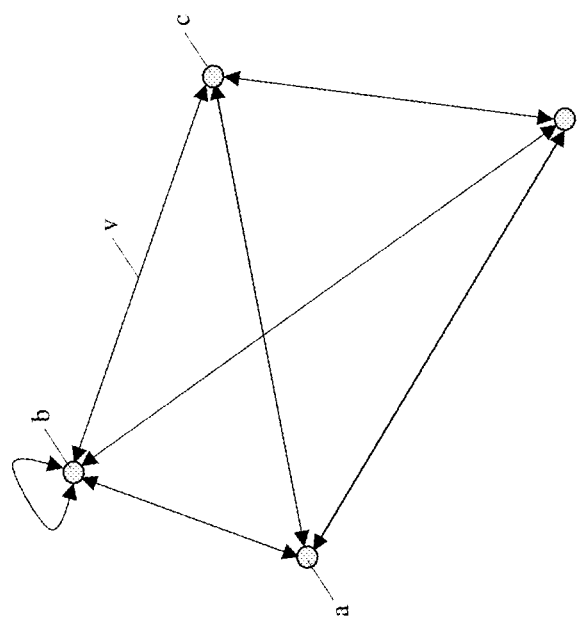
FIG. 11 illustrates a collection planning graph.

Let $N_V \in \mathbb{N}$ be a finite collection of vertices. We associate each vertex of a collection planning graph to one or more distinct real-valued vectors in $\mathbb{R}^{N_l}$; see FIG. 11 illustrating points a, b, c, and d associated to vectors such as v. The elements of these vectors may represent the physical locations (e.g., latitude, longitude) of an image requisition requisition in addition to other attributes or labels; hence, the points represented in FIG. 11 are real-valued points in $\mathbb{R}^{N_l}$ and $N_l$ is not necessarily equal to two. In general, we associate each vertex to a distinct point in $\mathbb{R}^{N_l}$; however, if a vertex has a loop, we represent it by two points in $\mathbb{R}^{N_l}$ to denote two different attributes. See FIG. 12 illustrating points a, $b_1$, $b_2$, c, and d. Loops in a collection planning graph are as a result of stereo requisitions. Thus, if $N_R$ are the number of points in the real-valued label space, we have $N_R \geq N_V$.

Let $l_1, l_2, \ldots, l_{N_R}$; $l_i \in \mathbb{R}^{N_l}$ be a collection of distinct real-valued vectors associated with a finite collection of $N_V \in \mathbb{N}$ vertices that represent the total requisition set for image collection. When it is clear from the context, we will also refer to the $N_R$ points in $\mathbb{R}^{N_l}$ as vertices. In general, $N_V$, and hence $N_R$, vary with time because of new requisitions. For the moment, we suppress the dependence of $N_R$ on time and define a vertex indicator function as $$\hat{V}(l) := \sum_{i=1}^{N_R} I(l, l_i) \quad (6)$$

Thus $\hat{V}$ is a function of unit values over the locations of the vertices and zero everywhere else.

Development of a Payoff Functional

Let $v_i \in \mathbb{R}_+$, $i = 1, \ldots N_R$ be the intrinsic value assigned to each requisition (e.g., the dollar value the customer for image i is willing to pay). In general, $v_i$ depends upon a number of factors (e.g., image resolution, light/shadow conditions and so on). For the moment, we suppress its functional dependence of these factors and define a value indicator function as $$V(l) := \sum_{i=1}^{N_R} v_i I(l, l_i) \quad (7)$$

Let $$W = (l_{w_1} l_{w_2} \ldots l_{w_{N_f}}), w_j \in \mathbb{N}, j = 1, \ldots, N_f \quad (8)$$

be a sequence of locations that represents a given walk of $N_f$ fulfilments. We assume this walk is value summable; that is, we assume the payoff $P_\$$ collected for this walk is summable and given by $$P_\$(W) := \sum_{i=1}^{N_f} v_{w_i}$$

Let $\mathbb{R} \ni s \mapsto l_w \in \mathbb{R}^{N_l}$ be a line-integrable curve that passes through each point $l_{w_j}$, $j = 1, \ldots, N_f$ just once such that $$l_w(s_j) = l_{w_j} \text{ and } s_1 < s_2 < \ldots < s_{N_f}$$

Then from (5) and (7) if follows that $$\int_a^b V(l_w(s)) ds = \sum_{i=1}^{N_f} v_{w_i} = P_\$(W) \quad (9)$$

where a and b are any two numbers that satisfy $a < s_1$ and $b > s_{N_f}$ respectively. Using these concepts, we define a payoff functional $P_s: l_w(\bullet) \mapsto \mathbb{R}_+$ as $$P_s[l_w(\cdot)] := \int_a^b V(l_w(s)) ds \quad (10)$$

In its most fundamental form, the collection planning problem is to find a curve $s \mapsto l_w \in \mathbb{R}^{N_l}$ that maximizes (10) subject to all the constraints.

Incorporating Dynamical Constraints

Let $x \in \mathbb{R}^{N_l}$ be the state vector of the spacecraft. We assume a function L: $x \mapsto l$ is defined or given. That is, we assume we can define a function L that associates values of x to values in l-space. For instance, given the orbit and attitude vector of the spacecraft (x), we can find the intersection point (l) of the boresight with the ground (l-space). As will be apparent later, the function L need not be explicit; it is simply used to formulate the theoretical framework. Substituting $l = L(x)$ in (7) we can map the value indicator function from the label-space to state-space and write, $$V(x) := \sum_{i=1}^{N_R} v_i I(l(x, l_i)) \quad (11)$$

Let $x(\bullet)$: $t \mapsto x$ be a given state trajectory of the spacecraft. Then using (10) and (11) if follows that a payoff functional can be written in terms of $x(\bullet)$ as, $$\int_{t_0}^{t_f} V(x(t)) \frac{ds}{dt} dt \quad (12)$$

where, we have assumed a differentiable change in variables from s to t with $t_0$ and $t_f$ denoting the clock times associated with the points a and b respectively. It is very convenient to choose $$ds = dt \quad (13)$$

in (12) because we can define the payoff functional in the form of an objective functional $P_t$ for dynamic optimization in a standard "Lagrange" form as $$P_t[x(\cdot), u(\cdot), t_0, t_f] := \int_{t_0}^{t_f} V(x(t)) dt = \sum_{i=1}^{N_R} \int_{t_0}^{t_f} v_i(l(L(x(t)), l_i) dt \quad (14)$$

where $u(\bullet)$: $t \mapsto u$ is a control trajectory, u is a constrained control variable $$u \in \mathbb{U}(t,x) \subset \mathbb{R}^{N_u} \quad (15)$$

and $\mathbb{U}(t,x)$ is a state-dependent control constraint. In additional, the state and control variables are jointly constrained by the dynamics of the spacecraft, $$\dot{x} = f(x,u,t) \quad (16)$$

In transforming the original graph problem to a dynamic optimization problem, we also implicitly changed measures in (13). To ensure the validity of this "transformation," we enforce (5) as follows: First, note that because the value of I is one at $l=l_i$ and zero everywhere else, the computation of the integral $$\int_{t_0}^{t_f} I(L(x(t)), l_i) dt$$

generates a quantity that has units of time. Second, the integral produces the collection of time $\Delta t_i^C$ at vertex i. FIG. 14 illustrates a function $t \mapsto I(L(x(x)), l_i)$. Because the integral is also a functional: i.e., a map that sends $x(\bullet)$ to a real number, we can write, $$\Delta t_i^C = T_i^C[x(\cdot)] := \int_{t_0}^{t_f} I(L(x(t)), l_i) dt \quad (17)$$

$$\forall i = 1, \ldots, N_R$$

where $T_i^C$ is the collect-time functional $x(\bullet) \mapsto \Delta t_i^C \in \mathbb{R}$. The value of a collect $v_i$ can now be written in terms of a step function of $\Delta t_i^C$ as $$v_i \text{step}(\Delta t_i^C - \Delta t_i^*) \quad \forall i = 1, \ldots, N_R \quad (18)$$

where $\Delta t_i^*$ is a given required (i.e. minimum) collection time at vertex I, and step ($\xi$) is defined by $$\text{step}(\xi) := \begin{cases} 1 \text{ if } \xi \geq 0 \\ 0 \text{ if } \xi < 0 \end{cases}$$

Thus the payoff functional for any given collection program may be evaluated by computing a value function $V_{step}^\Sigma$ defined by $$V_{step}^\Sigma(\Delta t_1^C, \Delta t_{i2}^C, \ldots, \Delta t_{N_R}^C) := \sum_{i=1}^{N_R} v_i \text{step}(\Delta t_i^C - \Delta t_i^*) \quad (19)$$

Equation (19) is not the only way to compute a payoff functional. For instance, if there were to be no requirement on a minimum dwell time, and the only condition was a "visit" or a pass-through. Then, the payoff functional may be modeled according to a different value function $V_0^\Sigma$ defined by, $$V_0^\Sigma(\Delta t_1^C, \Delta t_{i2}^C, \ldots, \Delta t_{N_R}^C) := \sum_{i=1}^{N_R} v_i(1 - I(\Delta t_i^C, 0)) \quad (20)$$

Equations (19) and (20) may be generalized by letting $$V:(\Delta t_1^C, \Delta t_{i2}^C, \ldots, \Delta t_{N_R}^C) \mapsto \mathbb{R} \quad (21)$$

be a given value function that defines the value of a collection planning graph. Thus (19) and (20) may now be viewed as specific instantiations of (21). By its generality, (21) allows us to incorporate more realistic collection programs that may involve stereo, tristereo and other requirements for computing the value of a collect. As an example, suppose that target #1 was required to be imaged in stereo. Let us also suppose that we framed this requirement in terms of two vertices at $l_1$ and $l_2$. Then, if we collect at $l_1$ but not at $l_2$ (i.e. mono imaging), the value of a stereo collect is zero, and the value of a mono collect may also be zero. That is, the value of collects at $l_1$ or $l_2$ is conditional on the value of the joint collect. Such a valuation is not incorporated in (19) or (20) but is incorporated in (21) by its generality. It is apparent that V will usually be a nonsmooth function. Note also that by the generality of (21), we may also incorporate incomplete graphs in the problem formulation. This can be done by assigning the value of $-\infty$ (for maximization problems) for the conditional value of the two vertices that are not connected by an edge.

Suppose there are situations where the value of a collection planning graph depends upon a walk that is not adequately represented by (21). In this case, we may generalize (21) to $$V:(\Delta t_1^C, \Delta t_{i2}^C, \ldots, \Delta t_{N_R}^C; W) \mapsto \mathbb{R} \quad (22)$$

In this discussion, we limit discussion to value function representable by (21). Substituting (17) in (21), the payoff functional given by (14) can now be generalized to, $$P[x(\bullet), u(\bullet), t_0, t_f] := V(T_1^C[x(\bullet)], T_2^C[x(\bullet)], \ldots, T_{N_R}^C[x(\bullet)]) \quad (23)$$

From (23) it is apparent that the payoff functional is a function of a functional. Furthermore, the computational of the functional given by (17) involves a nonsmooth integrand. Thus, one of the major challenges in addressing the collection planning problem as posed in the preceding paragraph is the nonsmoothness of V. Deferring a discussion of this challenge to later sections, we first model additional constraints that are critical to a successful collection.

Detecting and Constraining Revisits

The value of the collect time $\Delta t_i^C$ generated by (17) is agnostic to the countable additivity of measuring time intervals. That is, (17) can produce the same $\Delta t_i^C$ in countable infinite ways as indicated in FIGS. 14 and 15, which show schematics of two different functions $t \mapsto I(L(x(x)), l_i)$ that generate the same $\Delta t_i^C = \Delta t = \Delta t_1 + \Delta t_2$. In the computation of the value function given by (19) there was an implicit understanding that $\Delta t_i^C$ was generated by a single collect over target i. The same understanding was implied in the formula given by (20). That is, multiple visits to the same target should not increase the value of the collect. In preventing such occurrences, we develop a revisit counter as follows: The derivative of the function $t \mapsto I(L(x(t)), l_i)$ denoted by $dI_i/dt$ is given by, $$\frac{dI_i}{dt} = \begin{cases} \sum_{k=1}^{N_i^C} \delta^D(t, t_k^{in}) - \sum_{k=1}^{N_i^C} \delta^D(t, t_k^{out}) & \text{if } N_i^C \geq 1 \\ 0 & \text{if } N_i^C = 0 \end{cases} \quad (24)$$

where $N_i^C$ is the number of collects over target i and $t_k^{in}$ and $t_k^{out}$ are the in and out time instances as indicated in FIG. 13. Taking the absolute value of both sides of (24) and integrating over time we get $$\int_{t_o}^{t_f} \left|\frac{dI_i}{dt}\right| dt = \begin{cases} 2N_i^C & \text{if } N_i^C \geq 1 \\ 0 & \text{if } N_i^C = 0 \end{cases}$$

Hence for any given $x(\cdot)$, the number of collects over target i can be determined by the simple formula $$N_i^C = \frac{1}{2} \int_{t_o}^{t_f} \left|\frac{dI(L(x(t)), l_i)}{dt}\right| dt \quad (25)$$

Consequently, to prevent multiple collects over target i we impose the measure constraint, $$0 \leq \frac{1}{2} \int_{t_o}^{t_f} \left|\frac{dI(L(x(t)), l_i)}{dt}\right| dt \leq 1 \quad (26)$$

Incorporating Imaging Constraints

For the purposes of clarity in the presentation of the ideas, we assumed in the preceding paragraphs that a collect had (a nonzero) value if l was equal to $l_i$ and zero otherwise. This is only true if $l_i$ comprises attributes that must be satisfied with strict equality. More often, imaging constraints are better described in terms of inequalities (e.g., minimum incidence angle, min/max azimuth angle etc.). Consequently, we now replace $l_i$ by a set $\mathbb{L}_i$ that represents the totality of all imaging constraints on vertex i. That is, a collect has (a nonzero) value if $l \in \mathbb{L}_i$ and zero otherwise. The inclusion of this concept changes (17) (with $l_i$ replaced by $\mathbb{L}_i$) and hence the subsequent computation of the payoff functional given by (23)

Incorporating Non-Imaging Constraints

Non-imaging path constraints constitute one of the major challenges in developing a feasible plan for image collection. Examples of these constraints are keep-out zones for star trackers (sensor occultation) and keep-in zones for communication antennas. Such constraints can be formalized as a set $\mathbb{X}(t) \subset \mathbb{R}^{N_x}$ with the requirement that $x(t) \in \mathbb{X}(t)$. As implied by the notation, the constraint set $\mathbb{X}(t)$ is time varying because the keep-in and keep-out zones depend upon the true anomaly of the spacecraft and the relative positions of the bright objects (Sun, moon etc.). Because we have framed the collection planning problem as a dynamic optimization problem, it is straightforward to incorporate such constraints in the problem formulation. This approach is in sharp contrast to the notion of inserting artificial collection points to generate a "dog-leg" maneuver for constraint satisfaction or altogether eliminating the target from collection consideration because of constraint violations.

Problem Formulation

We now collect all the equations to formulate a fundamental collection planning and scheduling problem. To this end, let $t_0$ be some initial clock time and $N_V$ be the total number of requisitions at $t_0$. As the clock time $t_0$ advances, $N_V$ changes due to the addition of new customer orders. Because these changes are not sufficiently rapid, we suppress the dependence of $N_V$ on $t_0$. In any event, we map $N_V$ to $N_R$ and define the collection planning and scheduling problem at $t_0$ as follows. Given:

1. a set of $\mathbb{L}_i$ of imaging constraints for each $i=1, \ldots, N_R$,
2. a set $\mathbb{X}(t) \in \mathbb{R}^{N_x}$ of non-imaging path constraints,
3. a state-dependent set $\mathbb{U}(t, x) \in \mathbb{R}^{N_u}$ of control constraints,
4. a vector of parameters $p \in \mathbb{R}^{N_p}$, and
5. an image value $v_i(p)$ for each $i=1, \ldots, N_R$.

determine a continuous-time state-control function pair $[t_o, t_f] \mapsto \{x, u\}$ that solves the following dynamic optimization problem (Problem NP):

$x(t) \in \mathbb{X}(t) \subset \mathbb{R}^N, u \in \mathbb{U}(t, x) \subset \mathbb{R}^N$ Maximize $P[x(\cdot), u(\cdot), t_f] := V(T^C[x(\cdot)], p)/(t_f - t_o)$ Subject to $\dot{x}(t) = f(x(t), u(t), t)$ $$0 \leq \frac{1}{2} \int_{t_o}^{t_f} \left|\frac{dI(L(x(t)), \mathbb{L}_i)}{dt}\right| dt \leq 1 \quad (27)$$

$(x_0, t_0) = (x^0, t^0)$ $0 < t_f \leq t_f^U < \infty$ where $T^C[x(\cdot)]$ is the vector functional defined by $$T^C[x(\cdot)] := \begin{bmatrix} T_1^C[x(\cdot)] \\ T_2^C[x(\cdot)] \\ \vdots \\ T_{N_R}^C[x(\cdot)] \end{bmatrix} \quad (28)$$

and each $T_i^C[x(\cdot)]$ is in turn defined by $$T_i^C[x(\cdot)] := \int_{t_o}^{t_f} I(L(x(t)), \mathbb{L}_i) dt$$

$i = 1, \ldots, N_R$

We have also incorporated the parameter p in the argument of V to imply that the valuation function also depends on a number of factors such as image resolution, cloud cover, etc. In (27), we also divided the value function by the total time $(t_f-t_0)$ compared to (23) to reflect the notion that it may be desirable to maximize a payoff in the least amount of time. Thus, the final time $t_f$ is an optimization variable as implied by the arguments of P. To ensure that the horizon does not extend to infinity, we impose the constraint $t_f \leq t_f^U$ where, $t_f^U < \infty$ is some canonical upper bound on $t_f$ such as an orbital period, 24 hours etc.

Smoothing Principles

It is possible to convert the nonsmooth problem NP to a smooth problem by incurring a small mathematical penalty for smoothing through the use of Urysohn's Lemma, a well-known concept in topology. The main idea behind smoothing is the use of bump functions and its off-shoots, to replace the usage of an indicator function.

Mathematical Preliminaries

Figure 16:
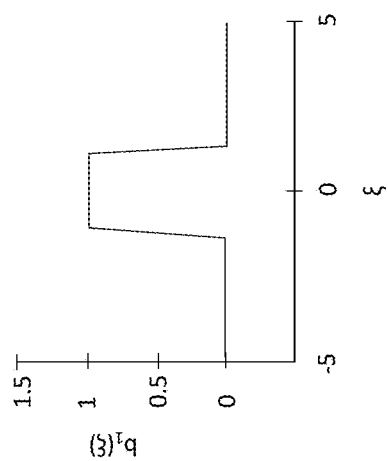
FIG. 16 illustrates a first bump function.

A bump function is a continuous nonnegative function that takes a constant value of one over a neighborhood of a point (in $\mathbb{R}^N$) and is zero everywhere else. An example of a bump function in $\mathbb{R}$ is shown in FIG. 16. This function was generated by plotting $$b_1(\xi) := \frac{\theta(2-\xi^2)}{\theta(\xi^2-1)+\theta(2-\xi^2)}; \theta(t) := \begin{cases} e^{-1/t} & \text{if } t > 0 \\ 0 & \text{if } t \leq 0 \end{cases} \quad (29)$$

It is easy to verify that $b_1(\xi)=0 \; \forall |\xi| > \sqrt{2}$ and $b_1(\xi)=1$ $\forall \xi \in [-1,1]$. Thus the support of $b_1$ is compact and given by $\text{supp}(b_1)=[-\sqrt{2}, \sqrt{2}]$. It can be easily verified that $b_1 \in C^\infty(\mathbb{R})$.

Bump functions can be designed to specifications in N-dimensional real space. That is, for any given compact set $\mathbb{L}_a \subset \mathbb{R}^{N_i}$, we can choose an open set $\mathbb{L}_{o} \supset_a$ that may be arbitrarily close but not equal to $\mathbb{L}_a$ such that $$B(l, \mathbb{L}_a) := \begin{cases} 1 & \text{if } l \in \mathbb{L}_a \\ 0 & \text{if } l \notin \mathbb{L}_o \supset \mathbb{L}_a \end{cases} \quad (30)$$

and $B(\cdot, \mathbb{L}_a) \in C^k(\mathbb{R}^{N_i})$ where $k \geq 0$. It is apparent from FIG. 16 that we may even choose bump functions from $C^\infty(\mathbb{R}^{N_i})$. The choice of the space $C^\infty(\mathbb{R}^{N_i})$ for designing bump functions has a particular advantage in the use of pseudospectral (PS) methods for solving optimal control problems because the convergence rate is almost exponential.

Smooth Problem Formulation

The originator of nonsmoothness in development and formulation of Problem NP is the indicator function I, and more specifically, the functions $i(\cdot, \mathbb{L}_i); \mathbb{R}^{N_i} \mapsto \mathbb{R}$ for $i=1, \ldots, N_R$. By replacing I with bump functions with appropriately chosen supports, $\text{supp}(B) | \mathbb{L}_i$, we can evaluate the collect-time functional (17) to a high accuracy by $$\Delta t_i^C = T_i^C[x(\cdot)] \approx \int_{t_0}^{t_f} B(L(x(t)), \mathbb{L}_i) dt \quad (31)$$

$$\forall i = 1, \ldots, N_R$$

The value function (21) may have nonsmoothness that are specific to the type of problem considered. For the case when the value is determined solely by a visit, we replace I in (20) by a bump function with a small support centered at zero. This yields a computation of $V_0^\Sigma$ according to $$V_0^\Sigma(\Delta t_1^C, \Delta t_{i2}^C, \ldots, \Delta t_{N_R}^C, p) \approx \sum_{i=1}^{N_R} v_i(p)(1 - B(\Delta t_i^C, 0)) \quad (32)$$

Note that the bump functions used in (31) and (32) are usually different. In (31), the domains of the bump functions are in $\mathbb{R}^{N_i}$ with supports governed by $\mathbb{L}_i$ while the domains of the bump functions in (32) are in $\mathbb{R}$ with supports centered at zero.

Figure 17:
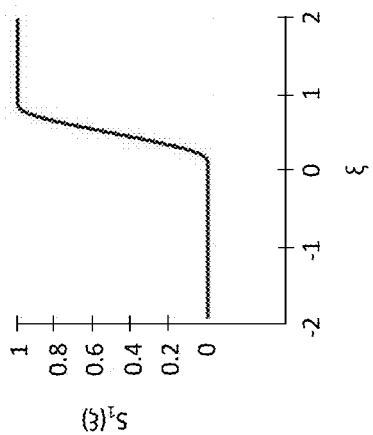
FIG. 17 illustrates a second bump function.

In case the value function is given by (19), a $C^k(\mathbb{R})$; $k \geq 0$ approximation to the step function (including $C^\infty(\mathbb{R})$) may be generated by using the same principles that were used in the construction of bump functions. As an example, the function shown in FIG. 17 was generated by $$S_1(\xi) := \frac{\theta(\xi)}{\theta(\xi)+\theta(1-\xi)}; \theta(t) := \begin{cases} e^{-1/t} & \text{if } t > 0 \\ 0 & \text{if } t \leq 0 \end{cases} \quad (33)$$

As In the case of (29), it can be easily verified that $S_1 \in C^\infty(\mathbb{R})$. Let $S \in C^k(\mathbb{R})$; $k \geq 1$ be a smooth step function. Then, if the value function is given by (19), its smooth approximation may be written as $$V_{step}^\Sigma(\Delta t_1^C, \Delta t_{i2}^C, \ldots, \Delta t_{N_R}^C) \approx \sum_{i=1}^{N_R} v_i S(\Delta t_i^C - \Delta t_i^*) \quad (34)$$

It is apparent that problem NP can now be solved to a high degree of approximation by the preceding smoothing principles.

ADDITIONAL REMARKS

Denote the smooth approximation to Problem NP as SP. Then, from the discussions of the preceding section, it is clear that a space collection planning and scheduling problem may be posed as Problem SP that may even by $C^\infty$ smooth. Even when $N_R$ is very large (e.g., several thousand or a million) it enters the problem only in the computation of the scalar collect-time functionals given by (31). Thus, the computer memory required for the storage of these variables is only about 8 MB for one million variables. The rest of the problem (see (27)) is small scale. Furthermore, pseudospectral (PS) methods have rendered solving smooth optimal control problems into a flight-ready technology. Thus, it appears that the new approach for collection planning and scheduling may now also be used for dynamic and real-time tasking. This is in contrast to the approaches of the current art wherein the collection planning a scheduling problem is solved by a graph problem, which may not be solvable in polynomial time.

Problem NP (or its smooth version, SP) has no combinatorial components because a graph problem is not constructed.

Assuming no stereo collects, the collection planning problem starts out as a complete digraph with $N_V(N_V-1)$ edges. Because the weights of these edges is slew time, it is clear that a mere construction of the graph requires solving $O(N_V^2)$ attitude slew problems. To put this in perspective, if $N_V$ is merely 100, then a calculation of the weights of the edges of the corresponding digraph requires a solution to 10,000 attitude slew problems. In our approach, we do not solve such large-scale slew problems because we do not compute the weights to construct the collection planning graph before solving the problem; instead, we use the "laws of weights" as framed by the dynamics of the system as well as any physical and operational constraints imposed on the generation of edges.

From the schematic illustrated in FIG. 1, it is clear that if a spacecraft could slew faster, more of the requisitions may be fulfilled thereby increasing the value of the payoff functional P. Based on this rationale, it can be shown that the number of collects can be substantially increased by using optimal control theory for attitude maneuvering. This concept has been demonstrated in flight onboard NASA's TRACE spacecraft and in several ground-tests. The increase in the number of collects depends upon the type of the spacecraft (e.g., the shape of the agilitoid and the predefined sequence. For instance, for the TRACE spacecraft, the increase in the number of point collects was 20%. The same metric evaluated at the ground test facility for a different spacecraft equipped with control-moment gyros (CMGs) was over 200%.

All of these ground and flight demonstrations were exclusively focused on simply changing the attitude slews from the industry standard (eigenaxis) to the shortest time maneuver. In other words, the increase in the number of collects demonstrated in our prior work was agnostic to the imaging sequence. In Problem NP, the imaging sequence is jointly optimized; hence, the increase in the value of the revenue functional would be potentially greater than otherwise.

By incorporating a high-fidelity dynamical model in (16) satisfaction of physical and operational constraints (such as jerk-limit constraints and Sun-avoidance constraints) is immediate. Nearly all of these constraints can be modeled as mixed state-control path constraints given in a canonical form as $$h(x,u,t) \leq 0 \quad (35)$$

where h is a given function. In other words, it is important to incorporate (35) in the optimal control problem formulation.

As noted previously, the function $l=L(x)$ that maps the state-space variables to the label-space variables need not be given explicitly. In fact this mapping may be given implicitly by some equation $$M(x,l)=0 \quad (36)$$

where $M \mapsto \mathbb{R}^{N_M}$. That is, $L(x)$ is a function that solves $M(x;L(x))=0$ for all x. Instead of attempting to solve such an equation to produce L, it is far simpler to simply impose (36) as a path constraint, $$M(x(t),l(t))=0 \quad (37)$$

The apparatus and method disclosed provides a fundamentally new approach to the collection planning and scheduling problem. The key contributions include: (a) the development of a real label space that is different from the state space, (b) the use of an indicator function in the label space to transform a graph problem to a functional optimization problem in real variables, (c) the integration of the state space with the label space to formulate a nonsmooth optimal control problem that incorporates both imaging and nonimaging constraints in a single unified formulation, and (d) the transformation of the nonsmooth problem to a smooth optimal control problem using the concept of bump functions. A smooth optimal control problem can be solved by many techniques. As a result of the entire process disclosed herein, a large number of heretofore difficult problems in solving an overall collection planning and scheduling problem can be effectively addressed. Because of this effectiveness, it is now possible to perform dynamic and even real-time tasking for satellite image collection.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of guiding a sensor comprising a rigid body system over a group of vertices during a transition of the rigid body system from an initial system state utilizing a plurality of actuators, the method comprising:
   communicating input data to a processor comprising a memory, where the input data comprises:
      a plurality of vertices l and a value indicator v for every vertex l in the plurality of vertices l, where the every vertex l comprises a point defined by a coordinate in an l-space, where the l-space is a real coordinate space, and where the value indicator v for the every vertex l defines an intrinsic value for the every vertex l; and
      a state vector $x(t_o)$ where the state vector $x(t_o)$ comprises an initial time $t_o$;
      a final time $t_f$ where the final time $t_f$ is later than the initial time $t_o$;
   providing a control policy for steering the sensor over an optimized curve s using the processor, where the processor is programmed to perform steps comprising;
      storing each vertex l and the value indicator v for the each vertex l in the memory;
      establishing a time interval from the initial time $t_o$ to the final time $t_f$;
      defining an initial curve s, where the initial curve s is a curve through the l-space and where the initial curve s is parameterized by a time t, and where the initial curve s is a function of a u(t), an x(t), and a function L(x), and where the u(t) and the x(t) comprise a state space model $\dot{x}(t)$, where the u(t) is one or more control variables of the rigid body system parameterized by the time t, the x(t) is one or more state variables of the rigid body system parameterized by the time t, the x(t) is functionally related to the u(t), and the function L(x) maps the state space model $\dot{x}(t)$ from a state space of the rigid body system to the l-space;
      optimizing the initial curve s subject to at least one constraint on the u(t), the x(t), or a combination of the u(t) and the x(t), and determining an optimized curve s in the l-space by evaluating an indicator

27 function for each individual vertex l comprising the plurality of vertices l, where the indicator function for the each individual vertex l is equal to a first constant when the each individual vertex l coincides with at least some portion of the initial curve s over the time interval and equal to a second constant when the each individual vertex l does not coincide with at least some portion of the initial curve s over the time interval, and evaluating a payoff functional $P_s$ for the curve s, where the payoff functional $P_s$ comprises a summation of the value indicator v for the each single vertex l multiplied by the indicator function for the each single vertex l, and designating the initial curve s when the payoff functional $P_s$ achieves a maxima as the optimized curve s, thereby solving for the optimized curve s;

quantifying the u(t) for the optimized curve s and providing a control policy for steering the sensor over the optimized curve s, where the control policy comprises the quantified u(t) for the optimized curve s over the time interval; and communicating the control policy to a communications port comprising the rigid body system; and communicating the control policy from the communications port to a plurality of actuators comprising the rigid body system to guide the sensor comprising the rigid body system over the group of vertices during the transition from the initial system state.

2. The method of claim 1 where the processor is further programmed to perform steps comprising:

receiving the state vector $x(t_o)$ where the state vector $x(t_o)$ quantitatively defines one or more state variables of the state space model $\dot{x}(t)$ in the state space of the rigid body system;

mapping the state vector $x(t_o)$ to an initial position in the l-space using the state vector $x(t_o)$ and the function L(x); and determining the optimized curve s where the initial position in the l-space comprises the the optimized curve s.

3. The method of claim 1 where the processor is further programmed to perform steps comprising:

storing the each vertex l in a first data structure comprising the memory;

generating a specific set for the initial curve s, where each element in the specific set comprises one or more of points in l-space which comprise the initial curve s;

storing the specific set for the initial curve s in a subsequent data structure comprising the memory;

establishing the indicator function for the each individual vertex l by performing a data intersection operation between the first data structure and the subsequent data structure.

4. The method of claim 3 where the processor is further programmed to perform steps comprising:

storing the value indicator v for the each vertex l in a second data structure comprising the memory;

generating a Boolean Array from the data intersection operation between the first data structure and the subsequent data structure where the Boolean Array comprises elements having a first value and elements having a second value;

assigning the first constant of the indicator function to the first value of the Boolean Array and assigning the second constant of the indicator function to the second value of the Boolean Array; and evaluating the payoff functional $P_s$ for the initial curve s using the Boolean Array and the second data structure.

28

5. The method of claim 1 where one or more vertices l in the plurality of vertices 1 further comprises a neighborhood around the point defined by the coordinate in the l-space.

6. The method of claim 1 where the point defined by the coordinate in the l-space and comprising the every vertex l is a geographic point.

7. An apparatus for providing a guidance policy to a rigid body system comprising a sensor, the apparatus comprising:

the rigid body system, where the rigid body system comprises the sensor, a controller, one or more control actuators, and a communications port, where the controller is in data communication with the one or more control actuators and the communications port is in data communications with the controller; and a processor comprising a memory and programmed to provide a control policy for steering the sensor over an optimized curve s by performing steps comprising:

receiving a plurality of vertices l and a value indicator v for every vertex l in the plurality of vertices 1, where the every vertex l in the plurality of vertices l comprises a point defined by a coordinate in an l-space, where the l-space is a real coordinate space, and where the value indicator v for the every vertex l defines an intrinsic value for the every vertex l;

storing each vertex l and the value indicator v for the each vertex l in the memory;

receiving a state vector $x(t_o)$ where the where the state vector $x(t_o)$ quantitatively defines one or more state variables of a state space model $\dot{x}(t)$ in a state space of the rigid body system at an initial time $t_o$;

mapping the state vector $x(t_o)$ from the state space of the rigid body system to an initial position in the l-space;

receiving a final time $t_f$ where the final time $t_f$ is later than the initial time $t_o$;

providing the control policy for steering the sensor by performing steps comprising:

establishing a time interval from the initial time $t_o$ to the final time $t_f$;

solving for an optimized curve s in the l-space by performing steps comprising:

selecting an initial curve s, where the initial curve s is a first curve through the l-space, and where the initial curve s intersects the initial point in the l-space, and where the initial curve s is parameterized by a time t;

assessing an indicator function for each individual vertex l comprising the plurality of vertices l by:

accessing the memory and retrieving the each individual vertex l and the value indicator v for the each individual vertex l; and establishing the indicator function for the each individual vertex l, where the indicator function for the each individual vertex l is equal to a first constant when the each individual vertex l coincides with at least some portion of the initial curve s over the time interval and equal to a second constant when the each individual vertex l does not coincide with at least some portion of the initial curve s over the time interval;

evaluating a payoff functional $P_s$ for the initial curve s, where the payoff functional $P_s$ comprises a summation of the value indicator v for each single vertex l multiplied by the indicator function for the each single vertex l;

determining the optimized curve s in the l-space by optimizing the payoff functional $P_s$ by altering the initial curve s to generate a subsequent curve s, where the subsequent curve s is a second curve through the l-space which intersects the initial point in the l-space and is parameterized by the time t, and repeating the assessing the indicator function for the each individual vertex l comprising the plurality of vertices l steps and the evaluating the payoff functional $P_s$ for the initial curve s step by using the subsequent curve s as the initial curve s, and continuing the repeating until the payoff functional $P_s$ achieves a maxima, and assigning the subsequent curve s when the payoff functional $P_s$ achieves the maxima as the optimized curve s, thereby solving for the optimized curve s; and defining the control policy by defining a u(t), where the u(t) is one or more control variables of the rigid body system parameterized by the time t, and where the u(t), an x(t), and a function L(x) comprise the state space model $\dot{x}(t)$, where the x(t) is one or more state variables of the rigid body system parameterized by the time t and the x(t) is functionally related to the u(t), and where the function L(x) maps the state space model $\dot{x}(t)$ from the state space of the rigid body system to the l-space, and where the u(t) directs the sensor of the rigid body system over the optimized curve s, thereby providing the control policy for steering the sensor; and communicating the control policy to the communications port comprising the rigid body system.

8. The apparatus of claim 7 where the processor is further programmed to perform steps comprising:
storing the each vertex l in a first data structure comprising the memory;
generating a specific set for the initial curve s, where each element in the specific set comprises one or more of points in l-space which comprise the initial curve s;
storing the specific set for the initial curve s in a subsequent data structure comprising the memory;
assessing the indicator function for the each individual vertex l by performing a data intersection operation between the first data structure and the subsequent data structure.

9. The apparatus of claim 8 where the processor is further programmed to perform steps comprising:
storing the value indicator v for the each vertex l in a second data structure comprising the memory;
generating a Boolean Array from the data intersection operation between the first data structure and the subsequent data structure where the Boolean Array comprises elements having a first value and elements having a second value;
assigning the first constant of the indicator function to the first value of the Boolean Array and assigning the second constant of the indicator function to the second value of the Boolean Array; and
evaluating the payoff functional $P_s$ for the initial curve s using the Boolean Array and the second data structure.

10. The apparatus of claim 7 where the controller is a digital processor programmed to perform steps comprising:
receiving the control policy from the communications port; and
providing one or more signals to each of the one or more control actuators, where the one or more signals are a function of the control policy.

11. The apparatus of claim 10 where the rigid body system is a spacecraft and where the one or more control actuators comprises at least one control moment gyroscope, and where the processor is further programmed to provide the control policy comprising the u(t) where the u(t) comprises gimbal rate commands.

12. The apparatus of claim 11 where the spacecraft comprises the processor.

13. The apparatus of claim 7 where the processor is further programmed to perform steps comprising:
receiving one or more control constraints, where the one or more control constraints comprise the u(t);
defining the initial curve s as a function of at least the u(t) using the function L(x); and
optimizing the payoff functional $P_s$ subject to the one or more control constraints.

14. The apparatus of claim 7 where the processor is further programmed to perform steps comprising:
receiving one or more path constraints, where the one or more path constraints comprise the x(t);
defining the initial curve s as a function of at least the x(t) using the function L(x); and
optimizing the payoff functional $P_s$ subject to the one or more path constraints.

15. The apparatus of claim 7 where the processor is further programmed to perform steps comprising:
receiving one or more attributes where the one or more attributes are a function of the specific curve s;
assigning the one or more attributes to an individual vertex l in the plurality of vertices l; and
determining a value of the first constant of the indicator function by determining a number of the one or more attributes satisfied by the specific curve s.

16. A non-transitory computer readable medium with computer executable instructions for guiding a sensor comprising a rigid body system over a group of vertices during a transition of the rigid body system from an initial system state utilizing a plurality of actuators, the computer readable medium having instructions for:
receiving input data comprising:
a plurality of vertices l and a value indicator v for every vertex l in the plurality of vertices l, where the every vertex l comprises a point defined by a coordinate in an l-space, where the l-space is a real coordinate space, and where the value indicator v for the every vertex l defines an intrinsic value for the every vertex l;
a state vector $x(t_o)$ where the where the state vector $x(t_o)$ quantitatively defines one or more state variables of a state space model $\dot{x}(t)$ in a state space of the rigid body system at an initial time $t_o$;
a final time $t_f$ where the final time $t_f$ is later than the initial time $t_o$;
providing a control policy for steering the sensor over an optimized curve s using a processor comprising a memory by directing the processor to perform steps comprising;
mapping the state vector $x(t_o)$ to an initial position in the l-space;
storing each vertex l and the value indicator v for the each vertex l in the memory;
establishing a time interval from the initial time $t_o$ to the final time $t_f$;

mapping the state vector x(t$_o$) from the state space of the rigid body system to an initial position in the l-space;

solving for an optimized curve s in the l-space by performing steps comprising:

selecting an initial curve s, where the initial curve s is a first curve through the l-space, and where the initial curve s intersects the initial point in the l-space, and where the initial curve s is parameterized by the time t;

assessing an indicator function for each individual vertex l comprising the plurality of vertices l by:

accessing the memory and retrieving the each individual vertex l and the value indicator v for the each individual vertex l; and establishing the indicator function for the each individual vertex l, where the indicator function for the each individual vertex l is equal to a first constant when the each individual vertex l coincides with at least some portion of the initial curve s over the time interval and equal to a second constant when the each individual vertex l does not coincide with at least some portion of the initial curve s over the time interval;

evaluating a payoff functional P$_s$ for the initial curve s, where the payoff functional P$_s$ comprises a summation of the value indicator v for each single vertex l multiplied by the indicator function for the each single vertex l; and determining the optimized curve s in the l-space by optimizing the payoff functional P$_s$ by altering the initial curve s to generate a subsequent curve s, where the subsequent curve s is a second curve through the l-space which intersects the initial point in the l-space and is parameterized by the time t, and repeating the assessing the indicator function for the each individual vertex l comprising the plurality of vertices l steps and the evaluating the payoff functional P$_s$ for the initial curve s step by using the subsequent curve s as the initial curve s, and continuing the repeating until the payoff functional P$_s$ achieves a maxima, and assigning the subsequent curve s when the payoff functional P$_s$ achieves the maxima as the optimized curve s, thereby solving for the optimized curve s; and defining the control policy by defining a u(t), where the u(t) is one or more control variables of the rigid body system parameterized by the time t, and where the u(t), an x(t), and a function L(x) comprise a state space model ẋ(t), where the x(t) is one or more state variables of the rigid body system parameterized by the time t and the x(t) is functionally related to the u(t), and where the function L(x) maps the state space model ẋ(t) from the state space of the rigid body system to the l-space, and where the u(t) directs the sensor of the rigid body system over the optimized curve s, thereby providing the control policy for steering the sensor; and communicating the control policy from the communications port to a guidance control module of the rigid body system for operating the plurality of actuators comprising the rigid body system to guide the sensor comprising the rigid body system over the group of vertices during the transition from the initial system state.

17. The method of claim 16 further comprising directing the processor to incorporate a set of dynamic constraints by using the function L(x) to define the initial curve s as a function of at least the u(t) and optimizing the payoff functional P$_s$ subject to one or more control constraints, where the one or more control constraints comprise the u(t).

18. The method of claim 16 further comprising directing the processor to incorporate a set of non-imaging path constraints by using the function L(x) to define the initial curve s as a function of at least the x(t) and optimizing the payoff functional P$_s$ subject to one or more path constraints, where the one or more path constraints comprise the x(t).

19. The method of claim 16 where the indicator function further comprises one or more attributes assigned to an individual vertex l, where the one or more attributes are a function of the initial curve s, and further comprising incorporating a set of imaging constraints by determining a value of the first constant of the indicator function by determining a number of the one or more attributes satisfied by the initial curve s.

* * * * *